US011940286B1

(12) United States Patent
O'Neil

(10) Patent No.: US 11,940,286 B1
(45) Date of Patent: Mar. 26, 2024

(54) FAST COMPUTATIONAL GENERATION OF DIGITAL PICKUP AND DELIVERY PLANS

(71) Applicant: GrubHub Holdings Inc., Chicago, IL (US)

(72) Inventor: Ryan J. O'Neil, Washington, DC (US)

(73) Assignee: GRUBHUB HOLDINGS INC., Chicago, IL (US)

( * ) Notice: Subject to any disclaimer, the term of this patent is extended or adjusted under 35 U.S.C. 154(b) by 426 days.

(21) Appl. No.: 16/290,835

(22) Filed: Mar. 1, 2019

(51) Int. Cl.
*G01C 21/34* (2006.01)
*G06Q 10/047* (2023.01)
*G06Q 10/0835* (2023.01)

(52) U.S. Cl.
CPC ....... *G01C 21/3476* (2013.01); *G01C 21/343* (2013.01); *G06Q 10/047* (2013.01); *G06Q 10/08355* (2013.01)

(58) Field of Classification Search
CPC .............. G01C 21/3476; G01C 21/343; G06Q 10/047; G06Q 10/08355
See application file for complete search history.

(56) References Cited

U.S. PATENT DOCUMENTS

| | | | |
|---|---|---|---|
| 2004/0039520 A1* | 2/2004 | Khavakh | G01C 21/3446 701/411 |
| 2014/0330739 A1* | 11/2014 | Falcone | G06Q 10/08355 705/338 |
| 2018/0268371 A1* | 9/2018 | Van Hentenryck | G06Q 10/06315 |
| 2019/0049988 A1* | 2/2019 | Meij | G05D 1/0274 |
| 2019/0079717 A1* | 3/2019 | Lee | G06F 3/013 |
| 2019/0164126 A1* | 5/2019 | Chopra | G06Q 10/08355 |

FOREIGN PATENT DOCUMENTS

JP     2010159995 A  *  7/2010

OTHER PUBLICATIONS

Zhao, Fang-Geng. "A Hybrid Genetic Algorithm for the Traveling Salesman Problem with Pickup and Delivery." DOI: 10.1007/s11633-009-0097-4. (Year: 2009).*

(Continued)

*Primary Examiner* — Angela Y Ortiz
*Assistant Examiner* — Charles Pall
(74) *Attorney, Agent, or Firm* — Baker Botts L.L.P.

(57) ABSTRACT

Technologies for computing, within a real-time time interval, of a digital plan for a vehicle in response to receipt by an online system of a volume of short-route pickup-and-delivery requests that increases over an operational period, include: receiving, by a hybrid optimization model, a set of digital inputs; where the set of digital inputs includes (i) pairs of geo-location data associated with pickup-and-delivery requests and (ii) geo-location data associated with the vehicle and (iii) precedence data that indicate an order that geo-locations in a pair of geo-location data are to be visited; using the hybrid optimization model to generate, in an execution time that does not exceed the real-time time interval, a pickup and delivery plan that conforms to the precedence data as digital output in response to the set of digital inputs; where the hybrid optimization model includes a constraint programming-based solver that operates in coordination with at least one other solver; creating, digitally storing, transmitting, and causing display of the digital output on a display of a device that is associated with the vehicle.

20 Claims, 11 Drawing Sheets

(56) References Cited

OTHER PUBLICATIONS

Focacci ,Filippo et al. "A Hybrid Exact Algorithm for the TSPTW." Informs J. Comput. 14 (2002): 403-417. Reterived Apr. 19, 2021: http://www.or.deis.unibo.it/research_pages/ORcodes/FocacciLodiMilano.pdf. (Year: 2002).*

Zhao, Fang-Geng. "A Hybrid Genetic Algorithm for the Traveling Salesman Problem with Pickup and Delivery." DOI: 10.1007/s11633-009-0097-4. (Year: 2009) (Year: 2009).*

Aguiar-Melgarejo, Penelope. A Constraint Programming Approach for the Time Dependent Traveling Salesman Problem. Computer Science [cs]. INSA Lyon, 2016. Retrieved on Apr. 20, 2021 at https://hal.archives-ouvertes.fr/hal-01514369/document (Year: 2016).*

Reyes, Damian, "The Meal Delivery Routing Problem", Mar. 1, 2018, Retrieved on Oct. 29, 2021 at http://www.optimization-online.org/DB_FILE/2018/04/6571.pdf (Year: 2018).*

Zhao, Fang-Geng. A Hybrid Genetic Algorithm for the Traveling Salesman Problem with Pickup and Delivery. Int'l J. of Automation and Comp. 06(1), Feb. 2009, 97-102, DOI: 10.1007/s11633-009-0097-4. Retrieved on Apr. 20, 2021 at https://link.springer.com/content/pdf/10.1007%2Fs11633-009-0097-4.pdf. (Year: 2009).*

O'Neil, "Exact Methods for Solving Traveling Salesman Problems with Pickup and Delivery in Real Time", dated Sep. 2, 2018, 34 pages.

\* cited by examiner

```
{
  "name": "grubhub-02-0",
  "comment": "size=2 instance=0",
  "nodes": ["+0", "-0", "+1", "-1", "+2", "-2"],
  "precedence": {
    "+0": "-0",
    "+1": "-1",
    "+2": "-2"
  },
  "edges": [
    [   0,    0,  389,  792, 1357,  961],
    [   0,    0,    0,    0,    0,    0],
    [ 389,    0,    0,  641, 1226, 1168],
    [ 792,    0,  641,    0, 1443, 1490],
    [1357,    0, 1226, 1443,    0,  741],
    [ 961,    0, 1168, 1490,  741,    0]
  ]
}
```

FAST COMPUTATIONAL GENERATION OF DIGITAL PICKUP AND DELIVERY PLANS

FIELD OF THE DISCLOSURE

One technical field of the present disclosure is computer-controlled vehicle-based pickup and delivery systems. Another technical field is computer systems for generating digital pickup-and-delivery plans for vehicles.

BACKGROUND

The developments described in this section are approaches that could be pursued, but not necessarily approaches that have been previously conceived or pursued. However, unless otherwise indicated, it should not be assumed that any of the developments described in this section qualify as prior art, or that these developments are generally known to a person of ordinary skill in the art.

Advancements in computer networking and data processing technology have fueled a rapid expansion of on-demand vehicle-based pickup and delivery services. Ride hailing and ride-sharing services, as well as on-demand delivery services for everything from groceries, alcoholic beverages, and meals, to snacks and convenience store items, have proliferated.

Different forms of on-demand pickup and delivery services have different objectives, constraints, levels of dynamism and urgency for decision making. For instance, in on-demand ride services, those requesting rides are inconvenienced from the moment they place a request. On the other hand, in on-demand food delivery, the time from request to delivery cannot be less than the sum of the food preparation time and the travel time from the food provider to the diner.

SUMMARY

The appended claims may serve as a summary of the present invention.

BRIEF DESCRIPTION OF THE DRAWINGS

In the drawings:

FIG. 2A and FIG. 2B are two views of an example model of pickup-and-delivery requests.

Figure 1A:
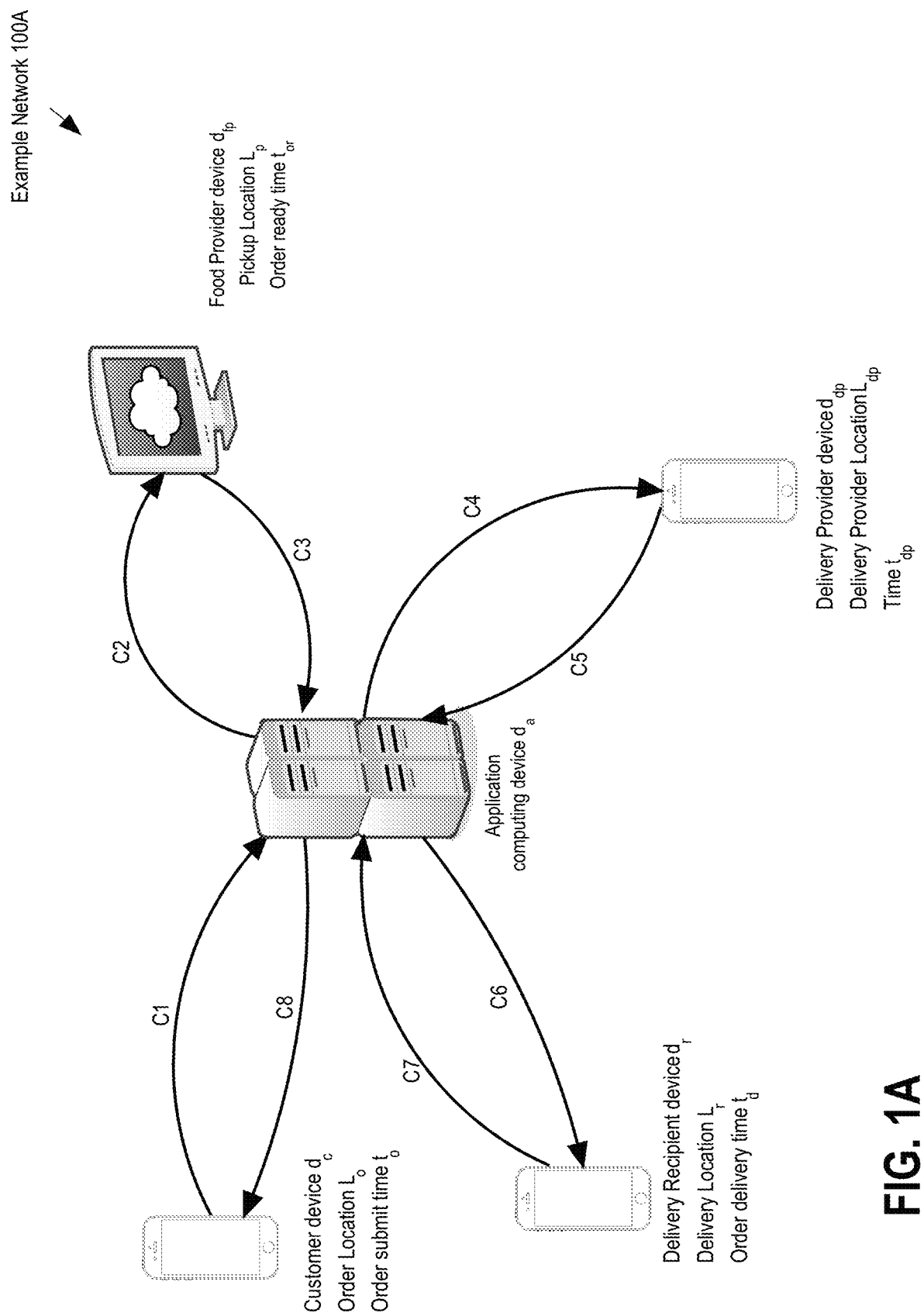
FIG. 1A is an example flow diagram illustrating one or more embodiments of a computer network including an example of electronic communications between components of the network.

While the present invention is amenable to various modifications and alternative forms, specific embodiments are shown by way of example in the drawings and are described in detail. However, the drawings and description are not intended to limit the invention to the forms disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

On-demand vehicle-based pickup and delivery services can be facilitated by software applications, including apps that operate on mobile electronic devices. When an online-based made-to-order food delivery service handles orders placed through the service by many different customers with many different restaurants, there can be multiple pickup locations and multiple delivery locations on a single trip made by a delivery provider vehicle. Shorter overall routes may be desirable in the context of made-to-order food delivery because prepared food often needs to be delivered close to the preparation time for customer satisfaction. The possibility of multiple pickup and delivery locations and the potential need for shorter routes increases the complexity of vehicle route planning and dispatch processes.

During operation of an online-based meal delivery service, it has been observed that existing route planning approaches have trouble adjusting to peak demand times. That is, as the number of pickup and delivery requests, also referred to as orders or instances, increases over the course of an operational time period, the solution times of the existing route planning approaches increase significantly, meaning that the computer system takes much longer to generate digital pickup and delivery plans when a large number of orders are received in a short time interval. This is because the existing route planning approaches using optimization technologies tend to seek to find and prove optimality of solutions, even during periods of high order volume. The longer computational times of these prior approaches delay the dispatch of vehicles to service the pickup and delivery requests precisely when computational efficiency is needed the most: during peak demand times. Moreover, longer routes are not feasible in some applications. For example, in on-demand meal delivery applications, it is often the case that a high volume of shorter routes needs to be generated in a short amount of time.

Additionally, existing approaches have been found to be inflexible in that they are difficult to adapt to new or different constraints. For example, pickup and delivery scenarios require associated pickups and deliveries be serviced by the same vehicle and that the pickup precede the delivery. Other commonly added or adjusted constraints are pickup and delivery time windows. For example, in meal delivery service operations, an order cannot be picked up from a restaurant before it is ready, and a delivery may not be made to a destination outside of an agreed-upon time window. Further, vehicles used in the pickup and delivery service may have capacity constraints. For instance, bicycle couriers have limited carrying capacity. These and/or other domain-specific constraints may need to be incorporated into the route planning process for specific applications.

To address the shortcomings of prior approaches and accomplish the above and/or other objectives, this disclosure describes a dispatch system in which digital pickup and delivery plans for on-demand vehicle-based services are mathematically generated. In an embodiment, the dispatch system uses a mathematical optimization process that is configured for solving a variation of the traveling salesman problem (TSP) known as the traveling salesman problem with pickup and delivery constraints (TSPPD).

This disclosure describes hybrid optimization processes that are configured to solve the TSPPD to produce digital pickup and delivery plans. Using the disclosed technologies, a high quality pickup and delivery plan can be generated quickly, often in milliseconds or less than a second. The pickup and delivery plans generated by the disclosed technologies allow orders from different pickup locations to be carried by the same vehicle simultaneously while enforcing pickup and delivery precedence relationships. A pickup and delivery plan, solution, path, route or trip, as those terms may be used herein, may refer to a digital ordered list of pickup and delivery geo-locations, where the list is assigned by an automated dispatch system to a particular pickup and delivery provider or vehicle and is transmitted by the dispatch system over an electronic communications network to an electronic device that is associated with the provider or vehicle.

Hybrid as used herein may refer to a combination of at least two different machine-executed computational processes. As described in more detail below, the disclosed hybrid approaches include machine-executed processes that combine constraint programming (CP) processes with one or more other machine-executed computational processes.

In some embodiments, CP-based processes are combined with mixed integer programming (MIP) processes. In some embodiments, a CP-based process is configured with a precedence constraint, using for example set-based circuit precedence. In some embodiments, a CP-based process is combined with an optimization procedure that includes combinatorial relaxations, such as assignment problem (AP) relaxations for reduced cost variable fixing, which may be referred to as reduced cost-based domain filtering. In some embodiments, a CP-based process is used to warm start an MIP process, where the CP-based process is configured with set-based circuit precedence and reduced cost-based filtering.

The disclosed technologies can reduce the execution time for a dispatch system to generate digital pickup and delivery plans, thereby freeing up computer system resources to perform other tasks while enabling real-time electronic communication of the pickup and delivery plans to pickup and delivery provider devices or vehicles. The disclosed technologies can improve the functioning of an on-demand pickup and delivery system by improving the system's ability to provide real-time responses to pickup and delivery requests even during peak demand times. Other benefits are set forth below or will be apparent from study of the disclosure as a whole. "Real-time," as used in this disclosure, may refer to a time interval from a system event to the system's output of a response to that event, which is perceived by an end user as immediate or current. For example, the latency may be less than a defined value measured in seconds, where the defined value is determined in accordance with the requirements of a particular design of the system and corresponds to the user's perception of immediacy.

While illustrated implementations of the disclosed technologies have been generated for an on-demand meal delivery application, the disclosed technologies also are applicable to many other on-demand vehicle-based pickup and delivery services, including but not limited to ride-sharing and ride-hailing applications.

Example Pickup and Delivery Network

FIG. 1A shows an example of networked computing devices and electronic communications that typically may occur in an online made-to-order food delivery scenario. An example network 100A includes computing devices $d_c$, $d_{fp}$, $d_{ap}$ and $d_r$, each communicating bidirectionally with an application computing device $d_a$ in order to accomplish ordering and delivery of a made-to-order food product. At time to, computing device $d_c$ which is currently at order location $L_o$ sends communication C1 containing an order for made-to-order food and geo-location data that indicates the order location $L_o$ over the network 100A to an online service operated by application computing device $d_a$. Order location data $L_o$ can be obtained from computing device $d_c$ using a sensor, for example a Global Positioning System (GPS) transceiver coupled to computing device $d_c$ and a wireless network interface. Computing device $d_c$ may be a mobile computing device such as a smart phone or laptop computer or embedded infotainment system of a vehicle, for example. Computing device $d_a$ acknowledges the order by sending communication C8 back to computing device $d_c$.

Computing device $d_a$ sends communication C2 to food provider device $d_{fp}$ which is currently at pickup location 1$p$ to initiate filling of the order by the made-to-order food provider. Food provider device $d_{fp}$ may be implemented as a desktop or laptop computer at a restaurant or other food preparation facility or a mobile computing device or embedded system associated with a mobile food operation such as a food truck, for example. Food provider device $d_{fp}$ sends communication C3 to application computing device $d_a$ including an estimated order ready time $t_{or}$.

Application computing device $d_a$ sends communication C4 to a computing device $d_{ap}$ used by a selected delivery provider. Communication C4 includes a digital pickup and delivery plan to be followed by the delivery provider vehicle. Computing device $d_{ap}$ may be a mobile computing device carried by a delivery provider, such as a smartphone or a wearable device, or an embedded device, such as an in-vehicle infotainment system or an embedded system of an autonomous or semi-autonomous vehicle. Vehicle as used herein may refer to any type of ground or air vehicle that can be used for on-demand pickup and delivery services and includes conventional vehicles as well as autonomous and semi-autonomous vehicles such as self-driving cars, robots and drones.

Computing device $d_{ap}$ periodically transmits geo-location data for current location $L_{dp}$ which is obtained by application computing device $d_a$ as communications C5, using a wireless network interface. Location data $L_{dp}$ indicates the current location of the delivery provider device $d_{ap}$ (as obtained by the device via on-board sensors or GPS transceiver, for example) and may additionally include other information, such as a travel time estimate $t_{ap}$ that indicates the estimated time of arrival of the delivery provider vehicle at a pickup or delivery location, or the status of a delivery task currently in progress and the number of other delivery tasks already in the provider's queue. Data contained in communications C5 may be used by application computing device $d_a$ to generate the digital pickup and delivery plan for the delivery provider or vehicle associated with the device $d_{ap}$.

Application computing device $d_a$ can use location data $L_{dp}$ and order ready time $t_{or}$ to determine an estimated order delivery time ta. Order delivery time to can be estimated dynamically based on variable data of a food provider, such as data associated with a line item identified in order data. For instance, if a particular line item of a food order has an increased preparation time due to high demand for the item or some other reason, the order delivery time to can be adjusted to account for the increased preparation time of the line item.

If the order is to be delivered to another recipient at a different location than the order location $L_o$, application computing device $d_a$ may exchange communications C6 and C7 with a delivery recipient computing device $d_r$ currently located at a location $L_r$, to set and update the recipient's expectations for delivery of the order. If the order recipient is the same as the ordering customer, communications C6 and C7 would be exchanged with computing device $d_c$.

In some implementations, one or more constraints associated with the order, which may be supplied any by of the devices $d_c$, $d_r$, $d_{as}$, $d_p$, can be imposed on the digital pickup and delivery planning processes. For example, the delivery recipient may require the order to be delivered within a specific time period and the food provider may stipulate a threshold amount of time that needs to elapse before the order will be ready for pickup. Also, travel time estimates for delivery provider vehicles to arrive at pickup or delivery locations can fluctuate due to traffic, weather, time of day, or other reasons.

During peak ordering times, such as the dinner hour(s), order ready times $t_{or}$ may be increased due to high demand and order delivery times $t_d$ may be increased due to a high volume of orders needing to be delivered during the time period. Thus, any one or more of these and/or other thresholds can change dynamically during any operational period of the online system and these changes can affect the application computing device $d_a$'s ability to efficiently generate digital pickup and delivery plans that satisfy all relevant constraints. Accordingly, aspects of the disclosed technologies are directed to improving the quality and/or timeliness of at least the network communications C4.

Fast Generation of Digital Pickup and Delivery Plans Using Hybridized Models

Figure 1B:
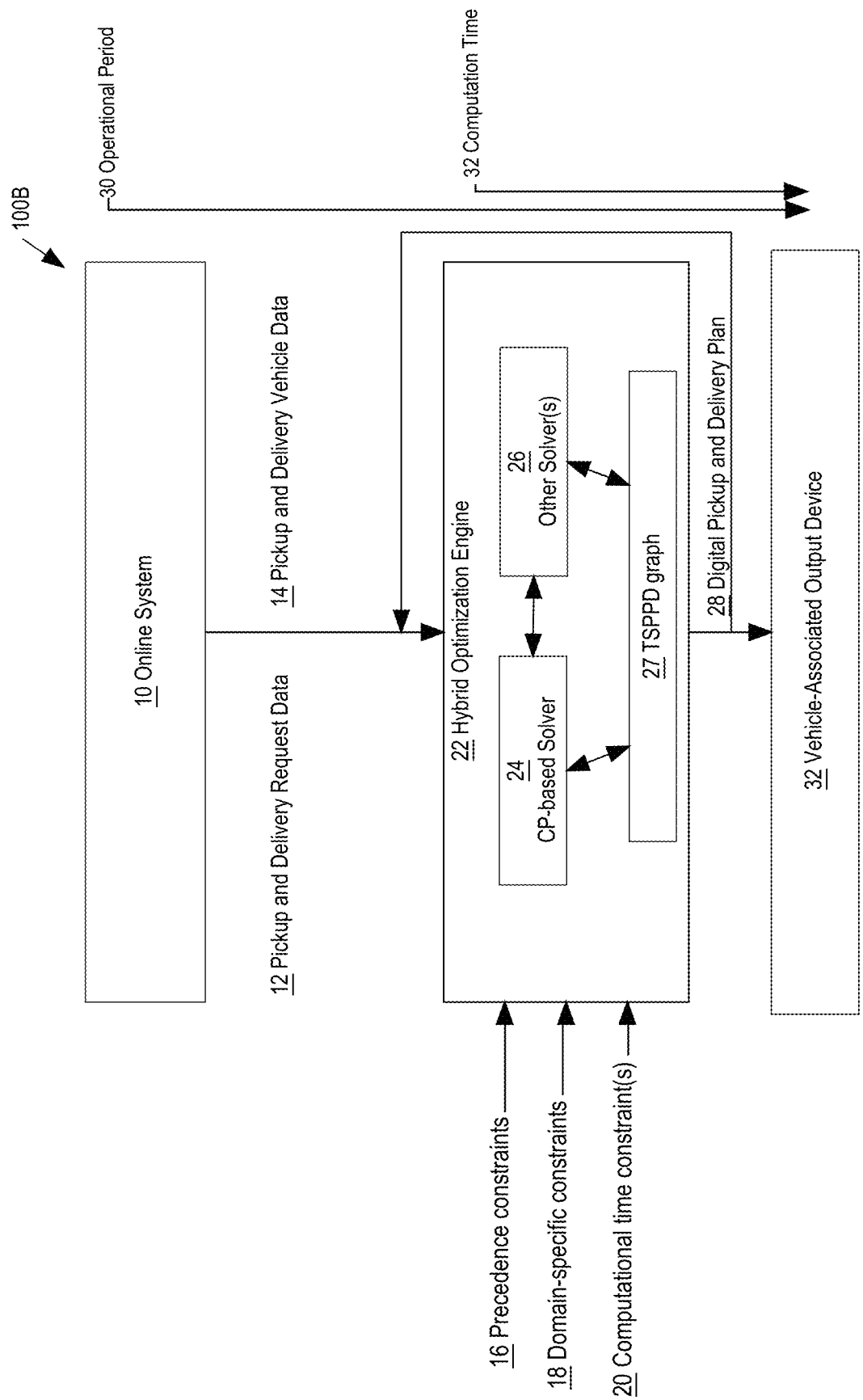
FIG. 1B is an example flow diagram showing processes that may be executed by one or more components of a computer network.

FIG. 1B is an example flow diagram showing processes that may be executed by one or more components of a computer network and data flows between the processes. In an embodiment, an online system 10 is implemented using one or more application computing devices $d_a$ that are programmed with pickup and delivery plan instructions 105 of dispatch system 104, shown in FIG. 1C, described below.

Online system 10 receives and processes pickup and delivery request data 12 during an operational period 30. In an embodiment, pickup and delivery request data 12 includes made-to-order meal delivery requests, order location $L_o$ and order submit time to, as well as order delivery constraints, such as maximum time for order delivery completion. Operational period 30 may correspond to a time interval, such as a range of hours that make up a portion of a day, for example, typical breakfast, lunch, snack or dinner time segments. In other embodiments, pickup and delivery request data 12 includes ride sharing or ride hailing requests and operational period corresponds to a time interval in which such requests are typically received, such as a morning or evening rush hour or pre- and post- sports or entertainment event time windows.

Online system 10 also periodically communicates with pickup and delivery provider devices to obtain pickup and delivery vehicle data 14, which includes geo-location data $L_{dp}$ of delivery provider vehicles and corresponding travel time estimate data $t_{ap}$. Online system 10 transmits pickup and delivery request data 12 and pickup and delivery vehicle data 14 to hybrid optimization engine 22. Online system 10 utilizes hybrid optimization engine 22 to generate a digital pickup and delivery plan 28 for a particular delivery provider vehicle, in an embodiment. In some embodiments, online system 10 uses hybrid optimization engine 22 to generate one or more digital pickup and delivery plans for all delivery provider vehicles in a particular fleet of vehicles that are in service during operational period 30.

In some embodiments, hybrid optimization engine 22 is implemented as a network service that is called by online system 10 using an application programming interface (API), for example. In other embodiments, hybrid optimization engine 22 is implemented within online system 10 and communicates with other processes of online system 10 using, for example, inter-process communication (IPC).

Hybrid optimization engine 22 includes a set of computational solvers which, in the illustrated embodiment, include a constraint programming (CP)-based solver 24 and one or more other solvers 26. A TSPPD graph 27 is built from the data 12, 14 in a similar manner as the graph shown in FIG. 2A, described below, but typically with between 6 and 12 requests (12-24 nodes plus origin and destination nodes). The solvers 24, 26 operate on TSPPD graph 27 and cooperate to build a route through the graph that includes all of the requests contained in a subset of the pickup and delivery request data 12, and which conforms to the relevant constraints 16, 18, 20. The computational building of the route is accomplished by using branching rules and precedence constraints to search the graph 27 and make decisions as to how to proceed from one node to another in the graph 27, and by using filtering processes to eliminate edges from the graph 27 that are not feasible or which are sub-optimal.

The other one or more solvers 26 include, in an embodiment, a mixed integer programming (MIP) solver. In other embodiments, other solver(s) 26 refers to an optimization procedure or combination of optimization procedures that hybridize the CP solver 24 by including a particular branching scheme and/or a particular set of precedence constraints and/or a particular type of filtering process. In an embodiment, other solver(s) 26 configure CP solver 24 by adding a heuristic branching scheme such as a sequential closest neighbor (SCN) branching scheme, and by adding a circuit-set-precedence constraint, and by adding reduced cost-based domain filtering.

Referring back to FIG. 1B, each solver of solvers 24, 26 is implemented as a combination of computer program code and data structures in which plan generation instructions 105 and corresponding data are embodied. An example of a computer programming framework that is used to obtain and manipulate data in one embodiment is JSON (Java Script Object Notation). In an embodiment, data structures are implemented using a graph database. In other embodiments, a relational data base is used.

Data structures used by solvers 24, 26, including TSPPD graph 27, are configured to store data as well as meta data that indicate relationships between the data. For example, pickup and delivery request data 12 includes ordered pairs of geo-locations; that is, for each request, a pickup location, a delivery location, and precedence data that identifies the pickup location as temporally preceding the delivery location, is stored. Each of these ordered pairs of geo-locations is associated with a particular online order that is uniquely identified by a customer account identifier, for example. Pickup and delivery vehicle data 14 includes a unique provider device identifier or vehicle identifier and associated geo-location data.

When the hybrid optimization engine 22 computes a pickup and delivery plan 28, data relationships are created between different geo-locations in the pickup and delivery request data 12 to form an ordered list of pickup and delivery locations across multiple requests. Cost data is used to determine how to order the locations on a route. The ordered list is assigned to a particular pickup and deliver provider or vehicle identifier.

An example specification for a data structure instantiated with stored data for a pickup and delivery plan is shown in Table 1 below. A positive (+) sign indicates a pickup location and a negative (−) sign indicates a delivery location.

TABLE 1

Example data structure for pickup and delivery plans.
Pickup and Delivery Plans

| Request ID | Precedence | Location | Plan ID | Plan Sequence |
|---|---|---|---|---|
| 1 | + | L1 | P1 | 2 |
| 1 | − | L2 | P1 | 3 |
| 2 | + | L3 | P1 | 1 |
| 2 | − | L4 | P1 | 4 |

In the example pickup and delivery plan P1 stored in Table 1, the plan sequence indicates that request 2 is to be picked up first, at location L3, but delivered last, at location L4. Request 1 is to be picked up, at location L1, after request 2 but delivered to location L2 before request 2 is delivered to L4. The plan sequence is determined by the hybrid optimization engine 22 based on cost data that is associated with travel between the various locations. The illustration of Table 1 includes only one plan but could include many plans each having a different Plan ID. Plans are associated with deliver provider devices using, for example, another data structure that links plan IDs and provider device or vehicle IDs.

In generating digital pickup and delivery plan 28, hybrid optimization engine 22 obtains constraint inputs that include precedence constraints 16, domain-specific constraints 18, and computational time constraint(s) 20. Precedence constraints 16 indicate that, within a pickup and delivery location pair of a particular request, pickup locations are to be visited prior to delivery locations.

Domain-specific constraints 18 indicate constraints that are specific to a particular on-demand vehicle-based pickup and delivery application. For example, meal delivery applications may have one or more constraints that are different than the constraints that are applicable to ride sharing or ride hailing applications. Whereas a constraint of ride sharing or ride hailing applications may be to minimize the time interval between pickup and delivery for each request, minimization of this time interval may not be feasible in a meal delivery application due to the need to account for meal preparation time. Another example of a domain-specific constraint is vehicle capacity. Whereas bicycles may not be feasible for ride sharing applications, they can be used in meal delivery applications if their delivery capacity is accounted for.

Computational time constraint(s) 20 indicate time limits that are applied to the computation time of hybrid optimization engine 22. Computation time, or model execution time, is measured from the time hybrid optimization engine 22 begins generating a digital pickup and delivery plan for a set of inputs 12, 14, 16, 18, 20 to the time at which hybrid optimization engine 22 produces a digital pickup and delivery plan 28 for that set of inputs 12, 14, 16, 18, 20. In an embodiment, a single computational time constraint 20 is specified as a limit on the total execution time of both solvers 24, 26.

In other embodiments, computational time constraints 20 are specified for each of, or at least one of, the individual solvers 24, 26. As discussed in more detail below, computational time constraint(s) 20 are used to bound the optimization processes executed by the solvers 24, 26. The hybrid optimization engine 22 is configured so that the constraints 16, 18, 20, and/or other constraints are incorporated into the plan generation instructions 105. Specific computational approaches that can be used by hybrid optimization engine 22 for pickup and delivery plan generation are described in more detail below.

In an embodiment, a feedback loop causes digital pickup and delivery plan 28 to be periodically returned to hybrid optimization engine 22 for revision based on new data 12, 14. Digital pickup and delivery plan 28 produced by hybrid optimization engine 22 is output to a vehicle-associated output device 32. In the illustrated embodiments, the digital pickup and delivery plan 28 includes visual output which is displayed on a display device, such as the display screen of a mobile computing device or a display mounted to a vehicle dashboard or handlebar. In other embodiments, digital pickup and delivery plan 28 includes audio output alternatively or in addition to visual output, and the audio output is played through a speaker, such as a speaker embedded in a mobile computing device or a vehicle console. The audio output is generated by converting text of the digital pickup and delivery plan 28 to speech, using for example a network-based text-to-speech (TTS) service.

Furthermore, some embodiments may comprise operating the vehicle to move along a driving route according to the pickup and delivery plan as specified in digital pickup and delivery plan 28. Operating the vehicle may include invoking an autonomous driving capability of the vehicle to execute acceleration, turning, braking, waiting and stopping operations based on digital pickup and delivery plan 28 to result in moving the vehicle according to the plan.

Hybridized Cp Solver

CP solver 24 is configured to handle precedence constraints and time windows directly in its propagation and searching. In one version, CP solver 24 is implemented using the GECODE CP framework. In one implementation, CP solver 24 is implemented using a vector of successors, next, as its primary decision variable. Given nodes V, next is a vector of length n=|V|, where each position is associated with a single node and is assigned the value of the node that comes directly after it in the tour. In an implementation, CP solver 24 is implemented using a circuit constraint, which handles propagation and ensures that a vector forms a Hamiltonian circuit in any feasible solution.

The circuit constraint accepts a variable, z, into which it propagates the total circuit length, along with a matrix of arc costs. An example circuit-based formulation is shown in Table 2 below.

TABLE 2

Example Circuit-Based CP Formulation.

min z
s.t. circuit (c, next, z)
next ∈ $V^n$

The CP formulation of Table 2 can fully represent the feasible set and objective function of the TSP portion of the TSPPD.

Branching and Propagation Schemes

To improve the optimization process, branching rules and additional propagation based on objective value bounds are used to direct the search through the graph 27. Example branching strategies that may be used in some embodiments include the first-fail tie-breaking rule and the regret heuristic.

In an embodiment, CP-solver 24 is configured with a sequential closest neighbor (SCN) branching strategy. The disclosed SCN branching is a modified version of the closest neighbor (CN) branching scheme in which precedence rules are respected by starting at +0 and always branching on the least cost feasible arc at the end of the current partial route.

Bounding Techniques

In an embodiment, CP solver 24 is configured to set a lower bound on an objective variable which is assigned to an objective value produced by the objective function. In one implementation, a constraint is added on the cost such that when a new incumbent solution is discovered in the search tree the search is bounded by the value of the incumbent solution. Other bounding techniques used in some embodiments include computing a Minimum Spanning Tree (MST) over the domain of the next vector and implementing an Assignment Problem (AP) relaxation of the TSP using the feasible domain of next in the search tree and another vector prev, which is the inverse of next.

Set-Based Circuit Precedence

In an embodiment, precedence is enforced using set variables. To do this, vectors of predecessor and successor nodes called pred and succ, respectively, are used to track which nodes must and must not precede and succeed each node based on the current structure of partial routes in the solution. An example of a TSPPD CP formulation using set precedence is shown in Table 3 below.

TABLE 3

Example CP with Set Precedence min z
s.t. circuit(next, z)
  circuit-precede-set (next.pred, succ)
  $next_{-0}$ = +0
  +i ∈ $pred_{-1}$        ∀ − i ∈ $V_D$
  −i ∈ $succ_{+1}$        ∀ + i ∈ $V_P$
  $pred_i$ ∩ $succ_i$ = ∅   ∀ i ∈ V
  $pred_{-i}$ ⊂ $pred_{+i}$   ∀ + i ∈ $V_+$
  $succ_{+i}$ ⊂ $succ_{-i}$   ∀ + i ∈ $V_+$ TABLE 3-continued Example CP with Set Precedence $pred_{+0}$ = ∅
$succ_{-0}$ = ∅
next ∈ $V^n$
pred ∈ $\{V^n\}^n$
succ ∈ $\{V^n\}^n$
z ≥ 0

In another embodiment, line 2 of Table 3 reads: "s.t. circuit(c, next, z)." The assignment of $next_o$ is required by the model and ignored during propagation. When any other variable next is assigned a value j in the search tree, the successor set for i must now be equal to the successor set of j with the addition of j itself. Similarly, the predecessor set of j must now be equal to the predecessor set of i with the addition of i.

In an embodiment, set precedence is implemented using a circuit-precede-set constraint, which adds local constraints to the current branch of the search tree upon assignment of any next. An example of the circuit-precede-set constraint is shown in Table 4 below.

TABLE 4

Example Precedence Constraint.

$next_i$ = j ⇒ $pred_j$ = $pred_i$ ∪ {i}
              $succ_i$ = $succ_j$ ∪ {j}
$next_{+i}$ = +j ⇒ −i ∈ $succ_{+j}$
              −j ∈ $succ_{+i}$
$next_{+i}$ = −j ⇒ −i ∈ $succ_{+j}$
              −i ∈ $succ_{-j}$
              +j ∈ $pred_{+i}$
              +j ∈ $pred_{-i}$
$next_{-i}$ = +j ⇒ +i ∈ $pred_{+j}$
              +i ∈ $pred_{-j}$
              −j ∈ $succ_{+i}$
              −j ∈ $succ_{-i}$
$next_{-i}$ = −j ⇒ +i ∈ $pred_{-j}$
              +j ∈ $pred_{-i}$ Further propagation is accomplished by explicitly adding to and removing values from the predecessor and successor sets upon propagation of $next_i$=j, depending on the values of i and j and what is known about their precedence relations. This allows failures to be detected early in the search tree. Set-based precedence operates directly on precedence structure and does not require time windows. In another embodiment, both set-based precedence and cost-based precedence are combined in applications in which there is precedence structure and time windows on event times.

Reduced Cost-Based Domain Filtering

In an embodiment, reduced cost-based variable fixing is implemented as a custom propagator inside of the GECODE CP framework. The propagator subscribes to value assignments on each index of the next vector. When first triggered, the propagator initializes and solves a primal-dual AP solving algorithm. When subsequent assignments to next occur in the search tree, the propagator performs an augmenting path update. The custom propagator tracks which variables are currently unassigned. When a branching decision is made such that $next_i$=j, the propagator forces the primal-dual algorithm to set row i to column j in its internal matrix, and removes any conflicting assignments from consideration. For each unassigned variable next and each j in the domain of next, the AP relaxation provides a reduced cost $rc_{ij}$. It also provides a dual bound w* for the objective function of the TSPPD at that location in the search tree. If, for any feasible arc (i; j), $w^* + rc_{ij} >= \hat{z}$, where $\hat{z}$ is the upper bound on the objective function, it is inferred that next !=j.

Mip Solver with Cp Warm Start

In an embodiment, an MIP model for solving the TSPPD starts by finding infeasible solutions and works toward feasibility through the addition of subtour elimination constraints (SEC) and precedence constraints. In an embodiment, the search conducted by the MIP solver is warm started with solutions from a search conducted by a CP solver. For example, the above-described hybridized CP solver 24 is used to find good solutions quickly and then those solutions are used as input to the MIP solver 26. In some embodiments, a time budget or threshold is assigned to the CP solver 24 when used in combination with the MIP solver 26.

Results of experiments conducted using various implementations of the above-described models are FIG. 3A, described below.

Networked System Example

Figure 1C:
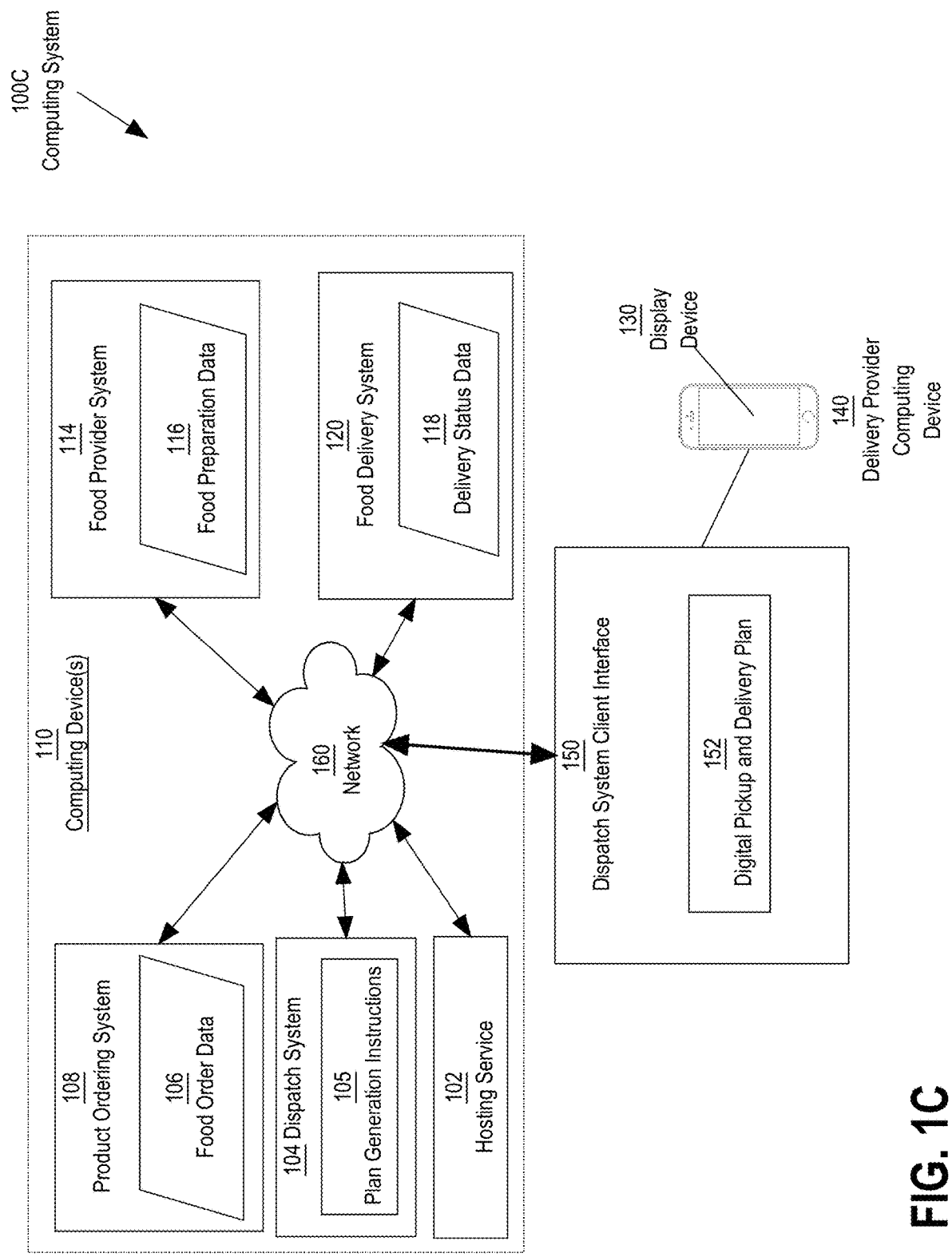
FIG. 1C is an example block diagram illustrating one or more embodiments of a computing system including one or more electronic components in which aspects of the present disclosure may be implemented.

FIG. 1C is an example block diagram illustrating one or more embodiments of a computing system including one or more electronic components in which aspects of the present disclosure may be implemented.

In the embodiment of FIG. 1C, computing system 100 includes computing device(s) 110, display device 130 and computing device 140, which are communicatively coupled to an electronic communications network 160. Implemented in computing devices 110, 140 using computer software, hardware, or software and hardware, are combinations of automated functionality, data structures, and digital data, which are represented schematically in FIG. 1C as hosting service 102, dispatch system 104, food order data 106, product ordering system 108, food provider system 114, food preparation data 116, delivery status data 118, food delivery system 120 and dispatch system client interface 150. System as used in this disclosure may refer to a single computer or network of computers and/or other devices. Computing device as used in this disclosure may refer to a computer or any other electronic device that is equipped with a processor.

Although computing system 100 may be implemented with any number N (where N is a positive integer) of hosting services 102, dispatch systems 104, food order data 106, product ordering systems 108, food provider systems 114, food preparation data 116, delivery status data 118, food delivery systems 120, dispatch system client interface 150, computing devices 110, display devices 130 and computing devices 140, respectively, in this disclosure, these elements may be referred to in the singular form for ease of discussion.

Also, hosting service 102, dispatch system 104, food order data 106, product ordering system 108, food provider system 114, food preparation data 116, delivery status data 118, food delivery system 120, dispatch system client interface 150 are shown as separate elements in FIG. 1C for ease of discussion but the illustration is not meant to imply that separation of these elements is required. The illustrated systems (or their functionality) may be divided over any number of physical systems, including a single physical computer system, and can communicate with each other in any appropriate manner.

In system 100, at least dispatch system 104 is hosted by a hosting service 102. Product ordering system 108, food provider system 114, delivery status data 118 and food delivery system 120 may be hosted by the same hosting service as dispatch system 104 or different hosting service(s). Hosting service(s) 102 enable network access to food order data 106, food preparation data 116, delivery status data 118 and dispatch system client interface 150 by other computing services on the network 160.

The example dispatch system client interface 150 is communicatively coupled to computing device 140 and to network 160. In some embodiments, computing device 140 is a client computing device, such as an end user's smart phone or laptop machine, or an embedded system of a mobile vehicle or robot, and computing device 110 is a server computer or network of server computers located on the Internet, in the cloud. As illustrated in FIG. 1C, display device 130 is implemented in computing device 140 but may be implemented as a separate device or as part of another device, or as multiple networked display devices, in other implementations.

In operation, computing device 140 operates dispatch system client interface 150 to establish logical connection(s) over network 160 with product ordering system 108 or food provider system 114 or dispatch system 104 or hosting service 102 or delivery status data 118 or food delivery system 120, and with computing device 140, as needed in order to send and receive digital pickup and delivery plan communications on the network 160, including communications between computing device 140 and other components of the computing system 100, as described in more detail below. For example, dispatch system client interface 150 outputs digital pickup and delivery plans generated by dispatch system 104.

Logical connection or communicatively coupled as used in this disclosure may refer to a flow of digital information or data communication that is established between two devices on a network by network software communicating with, for example, the devices' operating systems either directly or by a virtual machine. Examples of protocols that may be used to establish logical network connections include hypertext transfer protocol (HTTP) and secure sockets layer (SSL).

Dispatch system 104 when executed by a processor provides functionality for generating digital pickup and delivery plans using the techniques disclosed herein, and assigning delivery providers to those plans.

Product ordering system 108 when executed by a processor provides product ordering capabilities. For example, product ordering system 108 can collect order information, generate an electronic order and transmit the order to the provider of the ordered product electronically over the network 160. Product ordering system 108 can be implemented as a generic ordering service or as a domain-specific ordering system. For example, product ordering system 108 may be configured specifically for ordering food items from restaurants and/or other food providers.

Product ordering system 108 creates and stores, for example in a searchable database or other suitable data structure, food order data 106. Food order data 106 includes data associated with electronic orders of food, for example descriptions of made-to-order food items and/or other food products, and may further include activity data related to the electronic food order, such as indications of web browsing activity.

Food order data 106 can include unique identifiers for each food order and each item in the order, the computer account placing the order, the food provider account to which the order is directed, date and time of order placed, and quantity data for individual items of the food order.

Food order data 106 may also include special food preparation instructions and/or delivery instructions.

Food provider system 114 is part of or interfaces with product ordering system 108. For example, food provider system 114 maintains food preparation data 116, which includes specifications for the preparation by workers of the food provider of made-to-order food items that are offered for purchase through the electronic system implemented in computing system 100. These specifications include names and quantities of ingredients, preparation instructions, and estimated preparation times for the food items. Food provider system 114 may communicate estimated food preparation times to dispatch system 104. Food preparation data 116 may further include information about the food provider itself, such as name, location, business hours, and contact information.

Food delivery system 120 when executed by a processor enables monitoring and tracking of pick-up and deliveries of orders received by product ordering system 108. As such, food delivery system 120 communicates with product ordering system 108 and with dispatch system 104 over network 160. Food delivery system 120 can be implemented as a generic delivery service or as a domain-specific product delivery system. For example, food delivery system 120 may be configured specifically for monitoring and tracking delivery of made-to-order food items. In an embodiment, an end user, such as a courier, can track order status through button presses on a graphical user interface, which is displayed on a computer screen, such as a display screen of a mobile computing device. In other embodiments, order tracking is at least partially automated using, for example, geolocation data obtained from geolocation services.

Example Model of Pickup and Delivery Requests

Figure 2A:
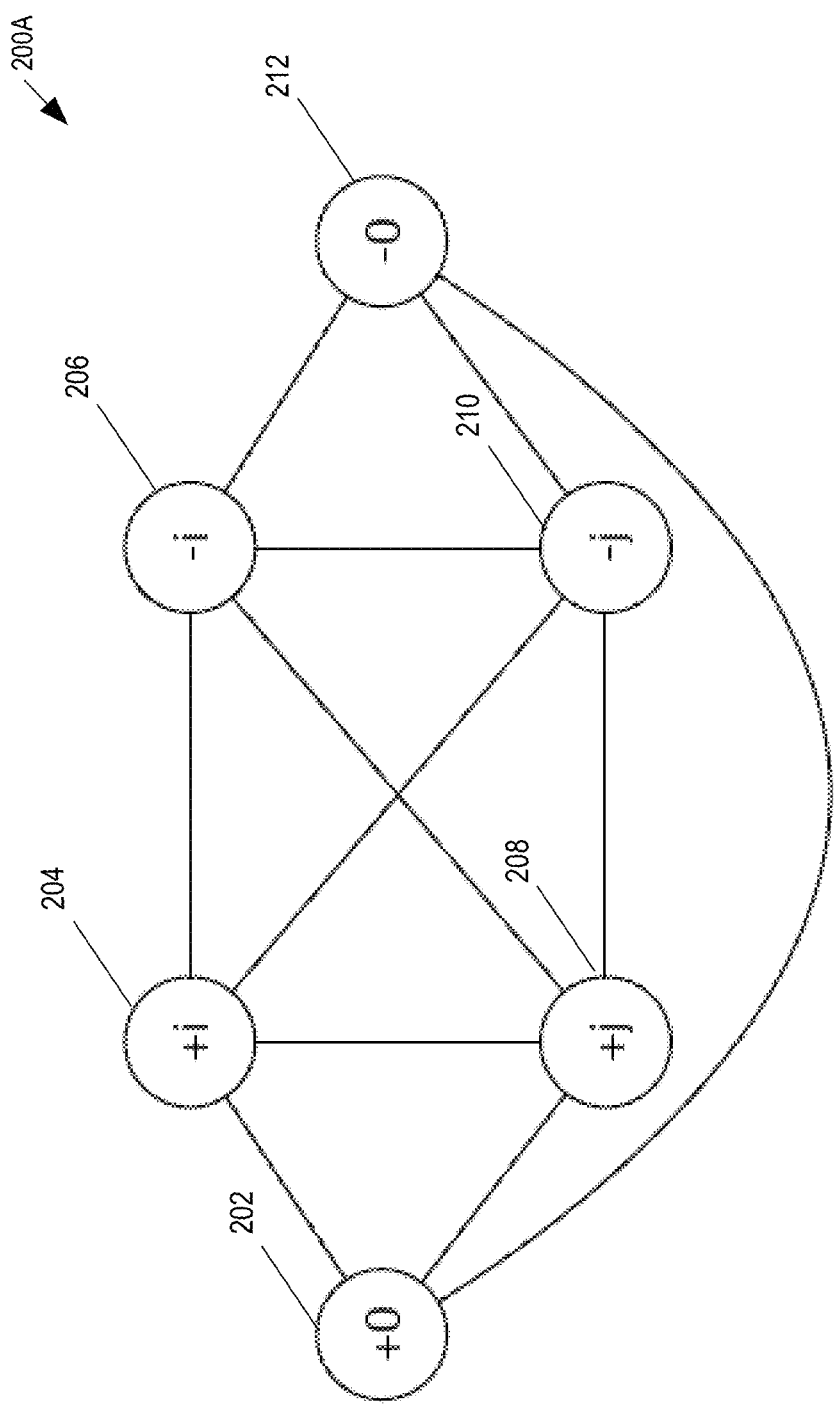

FIG. 2A and FIG. 2B are two views of an example model of pickup-and-delivery requests. FIG. 2A shows a graphical model 200A of a relatively small instance of a TSPPD with n requests, where each of the n requests has a pickup node 204, 208, and a delivery node 206, 210, and pickup must occur before delivery in order for a route to be considered feasible. The objective is to optimize total distance traveled while visiting each node exactly once. In FIG. 2A, n=2 such that there are two requests, i and j, and the edges connecting pairs of nodes indicate feasible routes as determined based on cost data. Each request has a pickup node, denoted by the plus sign (+), and a delivery node, denoted by the minus sign (−). Thus, (+i,−i) forms a request in which +i must be visited before −i in a feasible route. Origin and destination nodes 202, 212 are the origin and destination locations of the pickup and delivery provider or vehicle prior to and after execution of the route, and are denoted by +0 and −0, respectively.

Only feasible edges are identified, such that it is not possible to start a route with a delivery or to end a route with a pickup, and each node must directly precede and follow exactly one other node while each node is visited only once. The start and end nodes (+0,−0) must be part of any feasible tour, +0 must be connected to a pickup, −0 must be preceded by a delivery. The model 200A is considered asymmetric because, due to the precedence relationships between the pickup and delivery nodes of each request, the edge costs are not the same, bidirectionally. An example of a mathematical formulation of an asymmetric TSPPD model, including constraints, is shown Table 5 below.

TABLE 5

Example asymmetric TSPPD Formulation.

$$\min \sum_{(i,j)\in A} c_{ij} x_{ij}$$

$$\text{s.t.} \sum_{(i,j)\in A} x_{ij} = 1 \quad \forall\, i \in V \qquad (5)$$

$$\sum_{(i,j)\in A} x_{ij} = 1 \quad \forall\, j \in V \qquad (6)$$

$$x(\delta(S)) \geq 1 \quad \forall\, S \subset V, \qquad (7)$$

$$x(\delta(S)) \geq 4 \quad \forall\, S \subset V, \{+0, -i\} \subset S,$$

$$\{-0, +i\} \subset V\backslash S$$

$$x_{ij} \in \{0, 1\} \quad \forall\, (i, j) \in A \qquad (8)$$

In the formulation of Table 5, c specifies a non-negative cost for each edge, $x_{ij}$ is a binary decision variable for each edge where $x_{ij}$ has the value of 1 if the edge is a solution and 0 otherwise, δ(S) is a cutset, and A is an arc set that contains only the feasible arcs (directed edges)

FIG. 2B shows the model of FIG. 2A represented in JSON format with cost data 256 assigned to each edge. Nodes are defined at code portion 252 and precedence relationships are specified in code portion 254. Start and end nodes are represented as +0 and −0, where +0 is the start location and −0 represents the last location at the end of the route. The travel cost from any node to −0 may be coded as 0 to indicate that the final location of the route is the node that immediately precedes 0. The arcs connecting the −0 node to other nodes can have zero cost if the end location of the route does not matter.

Experimental Results— Computational Time Improvements

Figure 3A:
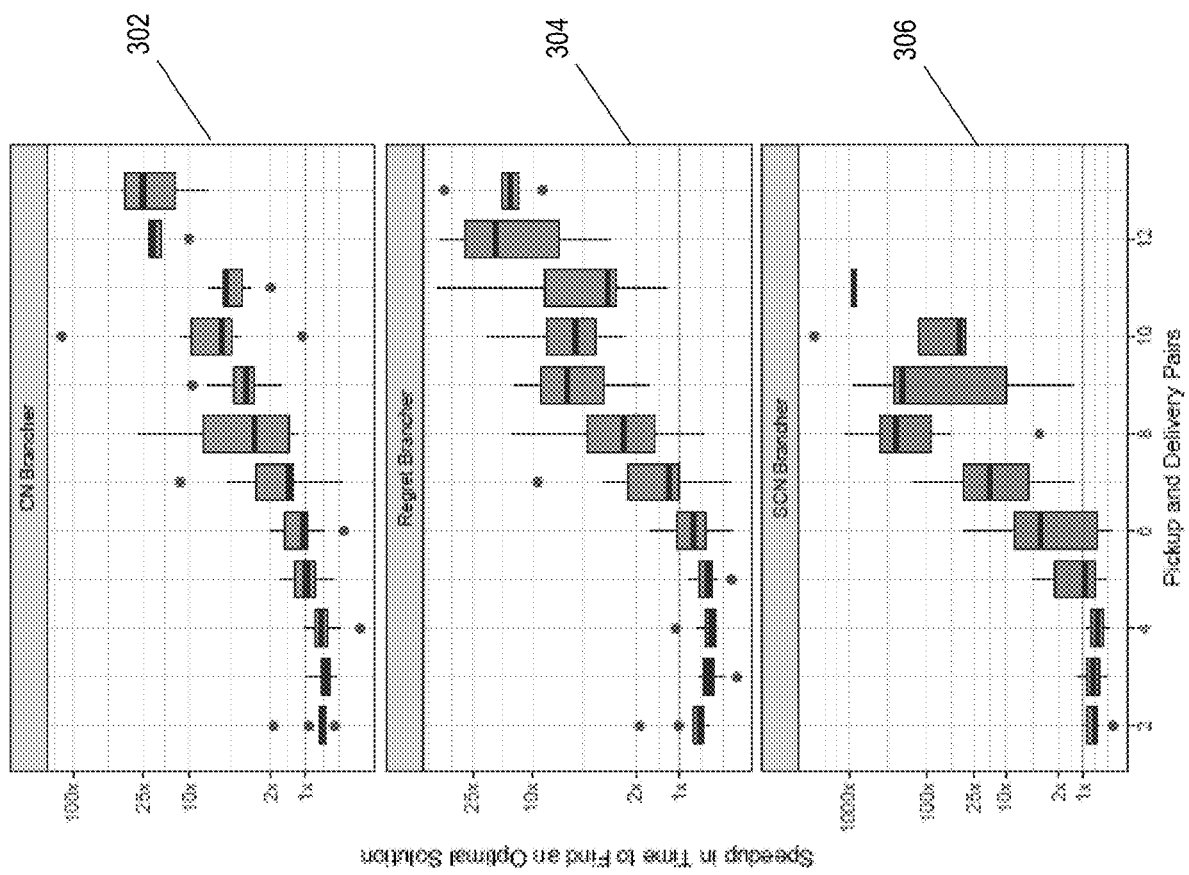
FIG. 3A shows three views of plots of data illustrating computational time improvements that resulted from implementation of the disclosed technologies, in an experiment.

FIG. 3A shows three views of plots of data illustrating computational time improvements that resulted from implementation of the disclosed technologies, in an experiment. The enumerative, MIP, CP, and hybrid forms of the TSPPD models were tested using instances constructed from pickup and delivery locations observed during an online on-demand meal delivery operation, along with expected travel times connecting location pairs. The test set had 10 instances per problem size, which enabled comparison of the performance of the models on realistic problems in meal delivery applications, in which pickup locations are likely to be clustered close together, and there may be many near optimal solutions that would have to be considered to prove optimality.

FIG. 3A shows the speedup obtained by the CP TSPPD solver due to incorporating reduced cost-based variable domain filtering using the AP relaxations. The plots 302, 304, 306 correspond to CN, regret, and SCN branching, respectively. It was observed that reduced cost-based domain filtering begins to improve the median solution time for finding optimal solutions at 6 pickup and delivery pairs, and for proving optimality, at 5 pairs. The speedup acquired appears to increase with the problem size. Further, filtering brings the performance of SCN branching closer in line with regret branching. With filtering, SCN branching finds high quality solutions significantly faster than regret branching, while regret branching remains better for finding optimal solutions.

Experimental Results— Comparison of Approaches

Figure 3B:
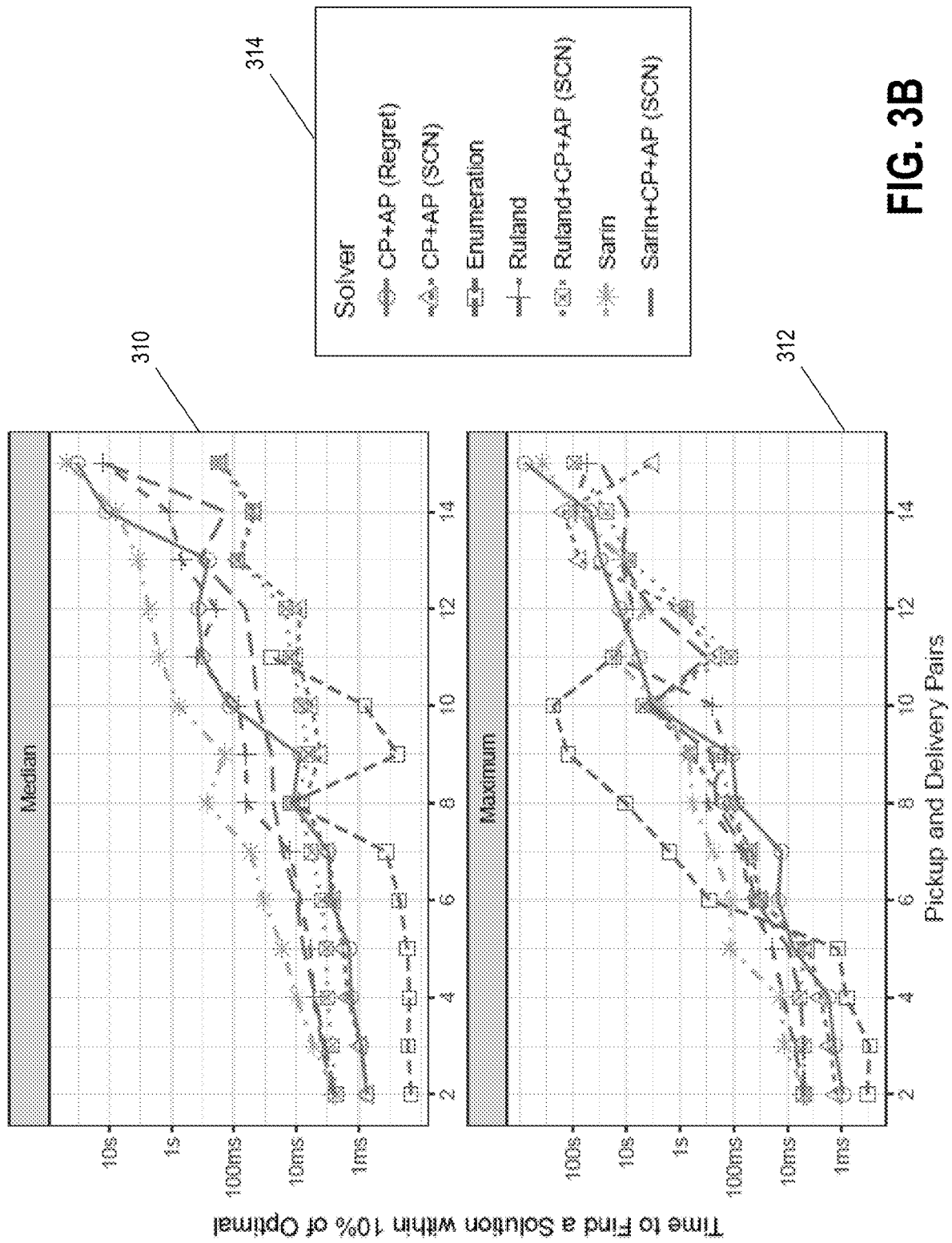
FIG. 3B shows two views of plots of data that illustrate differences in computational times observed for different implementations of the disclosed technologies, in an experiment.

FIG. 3B shows two views of plots of data that illustrate differences in computational times observed for different implementations of the disclosed technologies, in an experiment. In particular, FIG. 3B compares the performance of various combinations of the disclosed hybridized methods with conventional approaches, such as Enumerative, Ruland and Sarin.

Experimental results were generated for the several hybrid approaches using GUROBI 8.0.0 as the MIP solver and GECODE 6.0.1 for the CP models. Model code was written using C++14. The test machine was a LENOVO X1 Carbon with a 4-core Intel Core i5 CPU and 16 GB of RAM. Testing was performed using 1 thread and 4 concurrent threads. Testing was performed using real-world meal delivery data, including observed pickup and delivery locations and expected travel times connecting location pairs. Computational time thresholds and instance sizes were varied so that a comparison of the results over increasing order volumes (pickup and delivery pairs) could be made.

Example plots 310, 312 show for the following modeling approaches indicated by legend 314: enumeration; CP with set precedence, reduced cost-based variable domain filtering, and both regret and SCN branching; MIP; and MIP with a CP warm start time of 100 milliseconds (ms). Plot 310 shows the median times and plot 312 shows the maximum times for each problem size and event. Plots 310, 312 suggest that a CP-based hybrid process outperforms other approaches as the number of pickup and delivery pairs increases. In particular, a hybrid CP with regret branching outperforms pure MIP up to 7 pickup and delivery pairs, while the MIP model with a hybrid CP warm start performs best on instances with more than 10 pickup and delivery pairs. Also, the MIP with hybrid CP warm start was the only solver able to find optimal solutions to all test instances with 15 pairs in under 1000 seconds.

Looking specifically at the hybrid CP models, the described set-based precedence implementation outperformed cost-based precedence, and can be combined with cost-based precedence to strengthen the performance of the latter. Reduced cost-based variable domain filtering with AP relaxations was found to be a beneficial hybridization of CP with optimization techniques, and appears to pay increasing dividends as problem size increases.

Hybrid CP with SCN branching was found to be the most effective technique at finding good solutions (i.e. within 10% of optimal) quickly, and appeared to work well at warm starting the MIP models. Regret branching was found to be better at finding optimal solutions and proving optimality than SCN branching. These results provide evidence that supports the utility of hybrid optimization processes for real-time optimization of pickup and delivery plan generation.

Use Case: On-Demand Meal Delivery

Figure 4A:
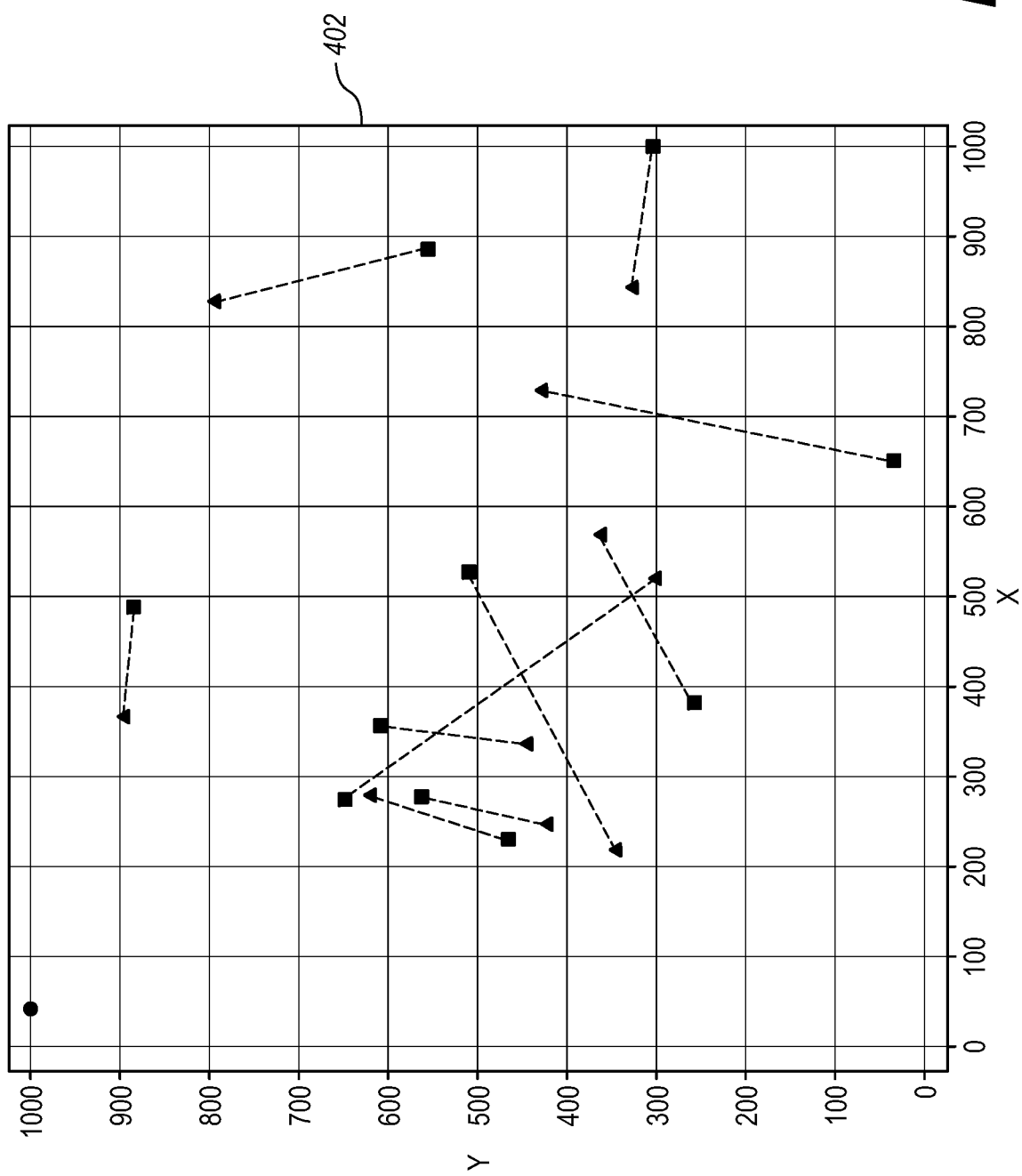
FIG. 4A shows an example plot of pickup and delivery request data received by an online system over an operational period.

FIG. 4A shows an example plot 402 of pickup and delivery request data received by an online system during an operational period. In plot 402, the circle represents the location of the pickup and delivery provider or vehicle, pickup locations are shown as triangles, delivery locations are shown as squares, and the grid represents map coordinates of a geographic pickup and delivery area. The dashed lines in FIG. 4A indicate pickup and delivery location pairs of a single order request.

Figure 4B:
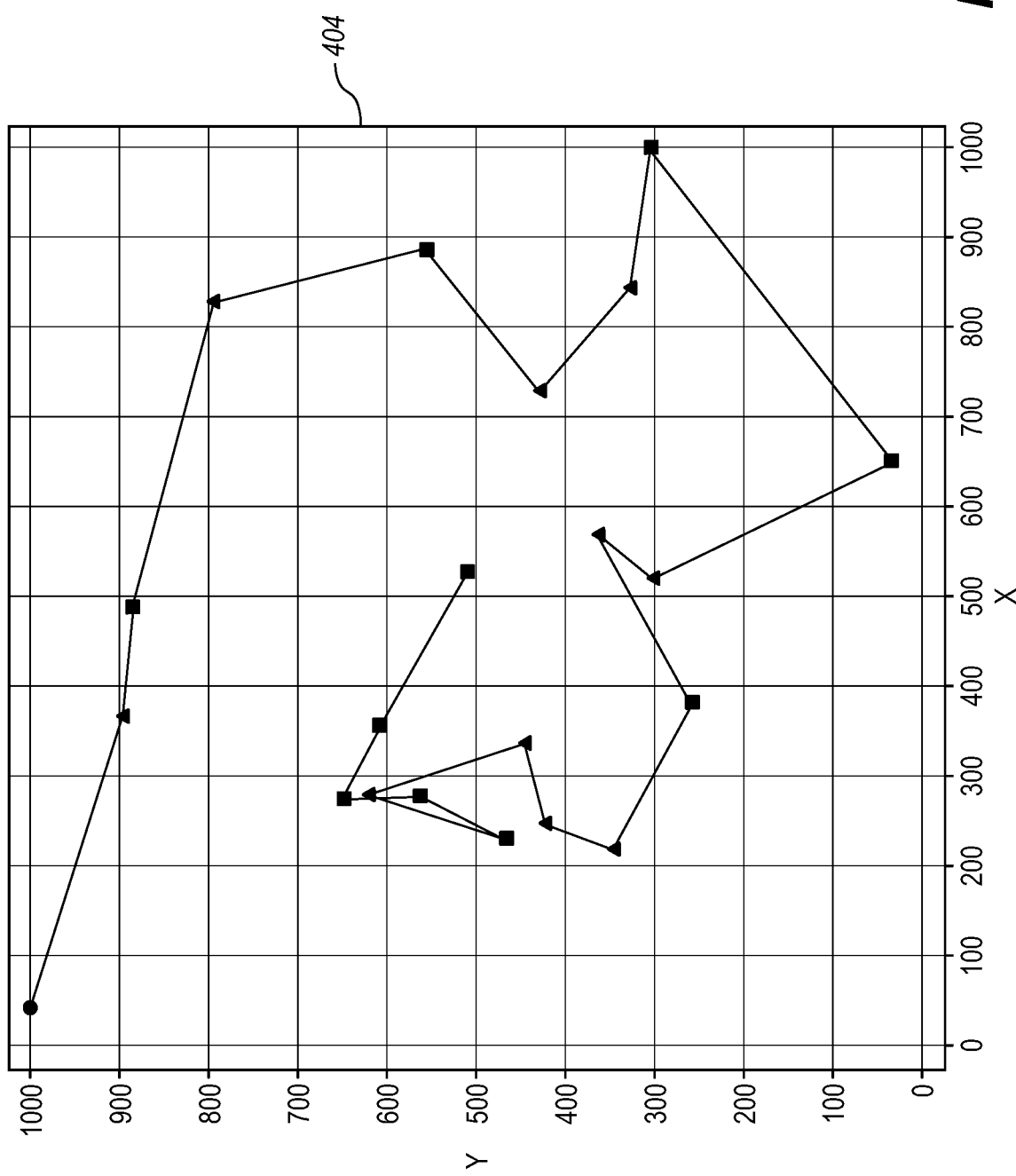
FIG. 4B shows an example plot of a digital pickup and delivery plan that may be produced using the disclosed technologies.

FIG. 4B shows an example plot 404 of a digital pickup and delivery plan that may be produced by applying the disclosed technologies to the pickup and delivery request data shown in FIG. 4A. .Beginning at the delivery provider location, the circle, a solid line indicates the route generated by the disclosed technologies. The example of FIG. 4B shows that location pairs can be temporally spaced apart by other intervening pickups or deliveries. The route shown in FIG. 4B is included in or forms the basis of a digital pickup and delivery plan 28 and may be part of the output that is presented by output device 32 of FIG. 1C.

Example Hardware Implementation

According to one embodiment, the techniques described herein are implemented by one or more computing devices. For example, portions of the disclosed technologies may be at least temporarily implemented on a network including a combination of one or more server computers and/or other computing devices. The computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such computing devices may also combine custom hard-wired logic, ASICs, or FPGAs with custom programming to accomplish the described techniques.

The computing devices may be server computers, personal computers, or a network of server computers and/or personal computers. Illustrative examples of computers are desktop computer systems, portable computer systems, handheld devices, mobile computing devices, wearable devices, body mounted or implantable devices, smart phones, smart appliances, networking devices, autonomous or semi-autonomous devices such as robots or unmanned ground or aerial vehicles, or any other electronic device that incorporates hard-wired and/or program logic to implement the described techniques.

Figure 5:
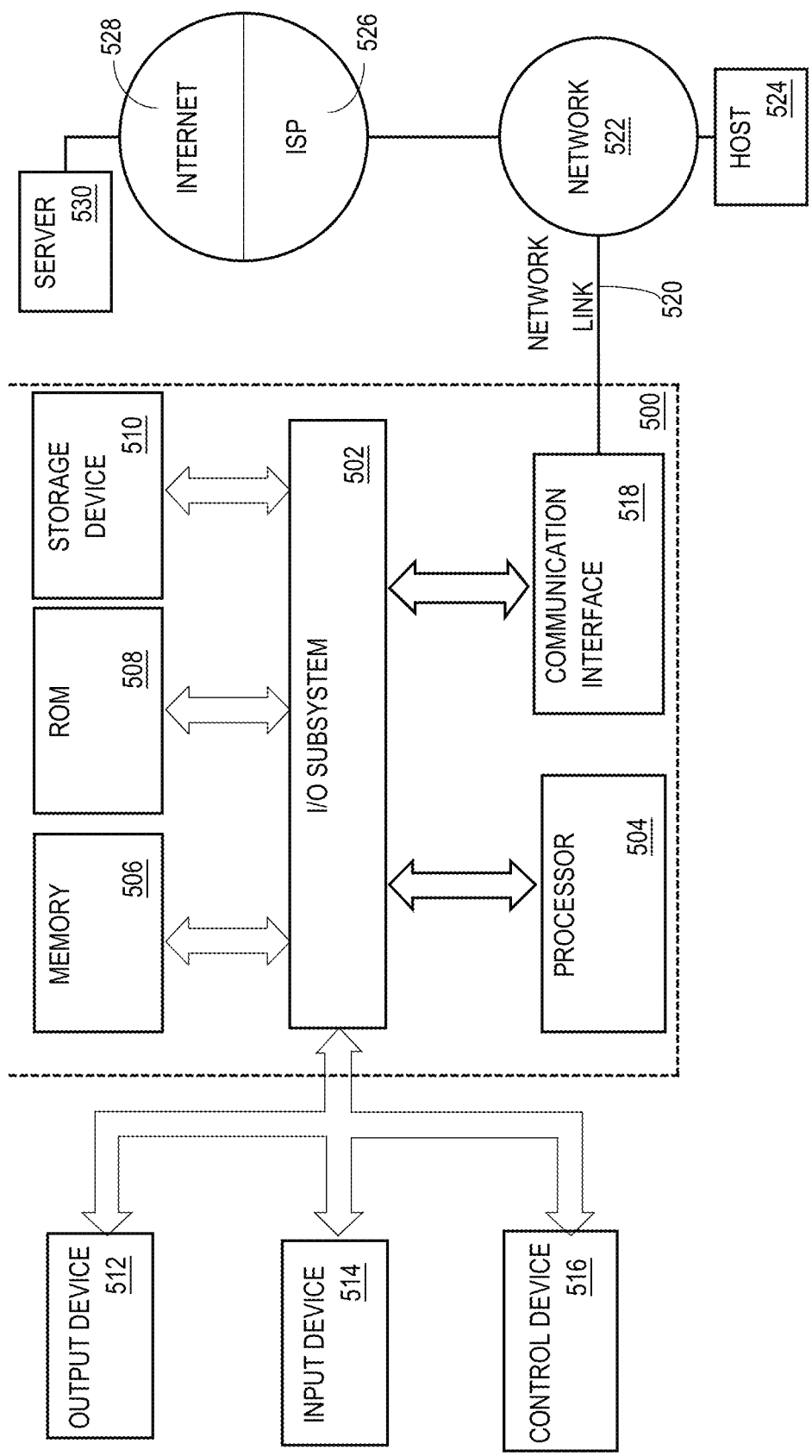
FIG. 5 is an example block diagram illustrating an embodiment of a hardware environment, which may be used to implement various aspects of the computing environment of FIG. 1C.

For example, FIG. 5 is a block diagram that illustrates a computer system 500 upon which an embodiment of the present invention may be implemented. Components of the computer system 500, including instructions for implementing the disclosed technologies in hardware, software, or a combination of hardware and software, are represented schematically in the drawings, for example as boxes and circles.

Computer system 500 includes an input/output (I/O) subsystem 502 which may include a bus and/or other communication mechanism(s) for communicating information and/or instructions between the components of the computer system 500 over electronic signal paths. The I/O subsystem may include an I/O controller, a memory controller and one or more I/O ports. The electronic signal paths are represented schematically in the drawings, for example as lines, unidirectional arrows, or bidirectional arrows.

One or more hardware processors 504 are coupled with I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor.

Computer system 500 also includes a memory 506 such as a main memory, which is coupled to I/O subsystem 502 for storing information and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, render computer system 500 into a special-purpose machine that is customized to perform the operations specified in the instructions.

Computer system 500 further includes a non-volatile memory such as read only memory (ROM) 508 or other static storage device coupled to I/O subsystem 502 for storing static information and instructions for processor 504. The ROM 508 may include various forms of programmable ROM (PROM) such as erasable PROM (EPROM) or electrically erasable PROM (EEPROM). A persistent storage device 510 may include various forms of non-volatile RAM (NVRAM), such as flash memory, or solid-state storage, magnetic disk or optical disk, and may be coupled to I/O subsystem 502 for storing information and instructions.

Computer system 500 may be coupled via I/O subsystem 502 to one or more output devices 512 such as a display device. Display 512 may be embodied as, for example, a touch screen display or a light-emitting diode (LED) display or a liquid crystal display (LCD) for displaying information, such as to a computer user. Computer system 500 may include other type(s) of output devices, such as speakers, LED indicators and haptic devices, alternatively or in addition to a display device.

One or more input devices 514 is coupled to I/O subsystem 502 for communicating signals, information and command selections to processor 504. Types of input devices 514 include touch screens, microphones, still and video digital cameras, alphanumeric and other keys, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be implemented as a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

Computer system 500 may implement the techniques described herein using customized hard-wired logic, one or more ASICs or FPGAs, firmware and/or program logic which in combination with the computer system causes or programs computer system 500 to operate as a special-purpose machine. According to one embodiment, the techniques herein are performed by computer system 500 in response to processor 504 executing one or more sequences of one or more instructions contained in memory 506. Such instructions may be read into memory 506 from another storage medium, such as storage device 510. Execution of the sequences of instructions contained in memory 506 causes processor 504 to perform the process steps described herein. In alternative embodiments, hard-wired circuitry may be used in place of or in combination with software instructions.

The term "storage media" as used in this disclosure refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage device 510 either before or after execution by processor 504.

Computer system 500 also includes a communication interface 518 coupled to bus 502. Communication interface 518 provides a two-way data communication coupling to network link(s) 520 that are directly or indirectly connected to one or more communication networks, such as a local network 522 or a public or private cloud on the Internet. For example, communication interface 518 may be an integrated-services digital network (ISDN) card, cable modem, satellite modem, or a modem to provide a data communication connection to a corresponding type of communications line, for example a coaxial cable or a fiber-optic line or a telephone line. As another example, communication interface 518 may include a local area network (LAN) card to provide a data communication connection to a compatible LAN. Wireless links may also be implemented. In any such implementation, communication interface 518 sends and receives electrical, electromagnetic or optical signals over signal paths that carry digital data streams representing various types of information.

Network link 520 typically provides electrical, electromagnetic, or optical data communication directly or through one or more networks to other data devices, using, for example, cellular, Wi-Fi, or BLUETOOTH technology. For example, network link 520 may provide a connection through a local network 522 to a host computer 524 or to other computing devices, such as personal computing devices or Internet of Things (IoT) devices and/or data equipment operated by an Internet Service Provider (ISP) 526. ISP 526 provides data communication services through the world-wide packet data communication network commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

Cloud-Based Service Overview

Figure 6:
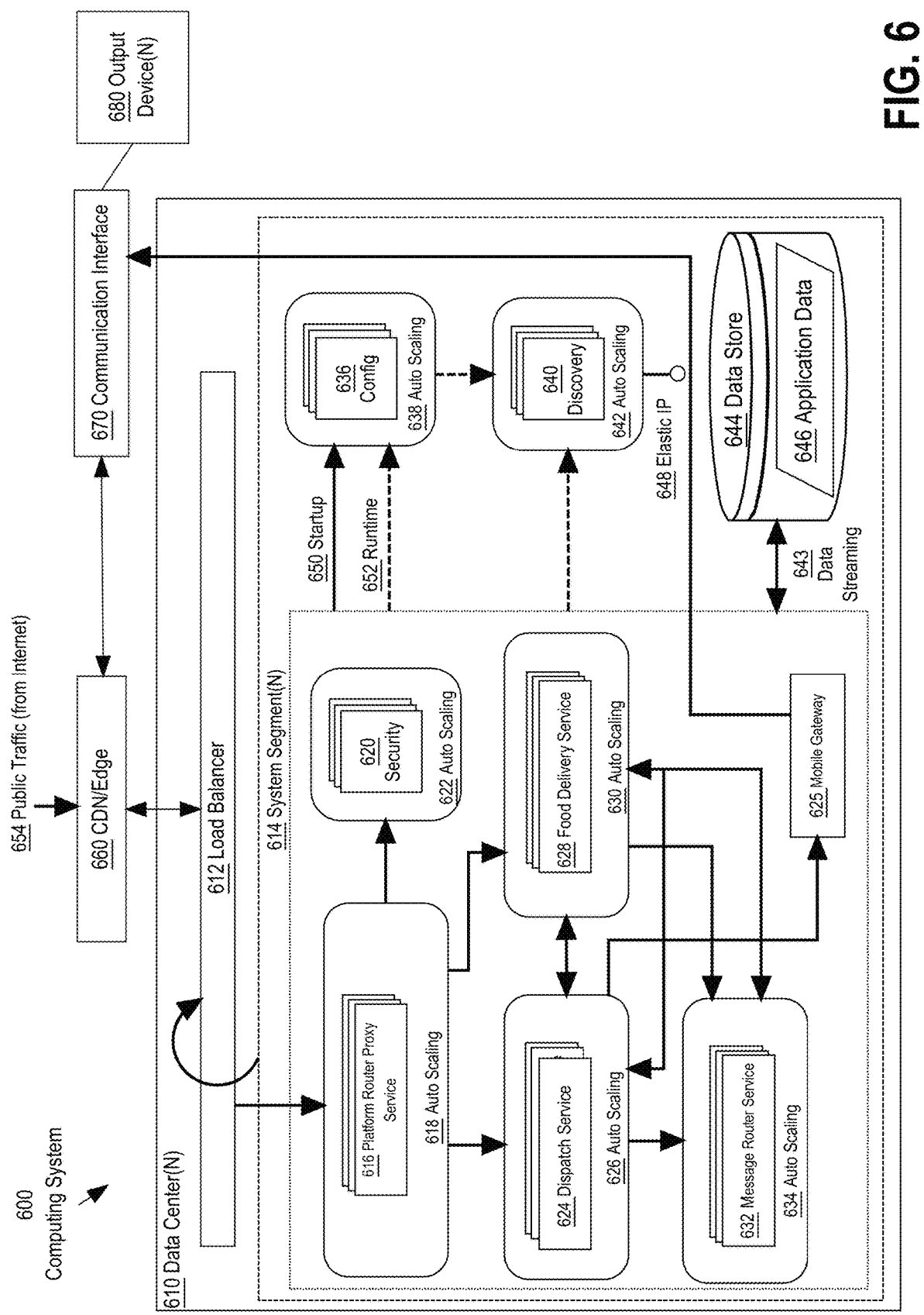
FIG. 6 is an example block diagram illustrating an embodiment of a cloud-based computing environment, which may be used to implement various aspects of the computing environment of FIG. 1C.

FIG. 6 is an example block diagram illustrating one or more embodiments of a cloud-based computing environment including one or more electronic components in which aspects of the present disclosure may be implemented. The electronic components illustrated in FIG. 6 are implemented in computer hardware, software, or a combination of hardware and software. In the embodiment of FIG. 6, computing system 600 includes N data centers, where N is a positive integer. In some embodiments, each data center 610 is implemented as a group of AMAZON EC2 nodes. Each data center 610 includes a load balancer 612 and a plurality of server computers. In an embodiment, load balancer 612 is an elastic load balancer that automatically distributes incoming application traffic and scales resources to meet traffic demands. The server computers of a data center 610 are communicatively coupled to one another by the load balancer 612.

The load balancer 612 of each data center 610 is communicatively coupled to the Internet by an edge device 660. Edge device 660 is a content delivery network (CDN) or an edge computer, in an embodiment. In other embodiments, edge device 660 is a router, a network switch, or other electronic device or service that performs the function of logically connecting separate networks. Public traffic 654 is routed to load balancer 612 through edge device 660 and to a particular system segment of data center 610 through load balancer 612. Public traffic 654 includes, for example, search queries and electronic food orders that are issued via a food ordering web site or a mobile app of a client device.

Any number N of output devices 680 may be communicatively coupled to data center 610 at any given time, via a communication interface 670 or a mobile gateway 625. Examples of output devices 680 are delivery provider computing devices 140 and display devices 130, described above. An output device 680 may be a delivery provider's mobile electronic device or an in-dash digital display of a delivery provider's vehicle, for example.

Communication interface 670 is a network interface, which includes or is coupled to, for example, a Wi-Fi access point or a cellular transceiver. Communication interface 670 connects edge device 660 with a mobile electronic device. In an embodiment, electronic messages indicating digital pickup and delivery plans, which are generated by a dispatch service 624, and electronic messages indicating geo-location data and/or acceptance or rejection of those digital pickup and delivery plans by a delivery provider vehicle, are exchanged between output device 680 and dispatch service 624 via mobile gateway 625.

In an embodiment, dispatch service 624 implements the functions of dispatch system 104, including plan generation instructions 105, and communicates with dispatch system client interface 150, which may reside on an output device 680, to display digital pickup and delivery plan 152 on output device 680. In an embodiment, mobile gateway 625 provides a secure electronic communication connection between dispatch service 624 and output device 680.

Data center 610 includes N system segments 614. A system segment 614 is a logical organization of computer components that implements a portion of the functionality of computing system 100, described above. In an embodiment, system segment 614 is implemented using AMAZON WEB SERVICE (AWS). FIG. 6 illustrates one system segment in detail, namely, a delivery system segment. In an embodiment, other system segments include a product ordering system segment and a food provider system segment, which are arranged in a similar manner as system segment 614.

System segment 614 includes a combination of automatically scalable cloud-based application-specific services and automatically scalable cloud-based support services that support the application-specific services. In FIG. 6, the application-specific services are delivery provider scheduling service 624 and food delivery service 628, while the supporting services are platform router proxy service 616, security service 620, message router service 632, config service 638, and discovery service 640. Delivery provider scheduling service 624 is a web service-based implementation of dispatch system 104, described above. Food delivery service 628 is a web service-based implementation of food delivery system 120, described above.

Platform router proxy service 616 handles network communications between the Internet and delivery system segment 614. Platform router proxy service 616 determines how to route network communications between different services and the Internet. Platform router proxy service 616 uses a mapping of server network addresses (endpoints) to the software-based services that are located at those endpoints, in order to determine which server(s) in data center 610 are running requested services.

Security service 620 authenticates requests for data made by different user accounts. Security service 620 verifies that the requesting account is authorized to request data from a particular service as identified by its endpoint. To do this, security service 620 matches the access level requested by an account to the corresponding requirement within the security policy implemented for the requested service.

Message router service 632 manages messaging queues between the different services of system segment 614. Config service 638 maintains the startup 650 and runtime 652 configurations for each of the services, including, for example, the type of service, the size of the instance to be used to run the service, threshold wait times for receiving a response before terminating a request, bucket sizes and batch sizes to use for certain calculations, etc. The configuration for any particular service changes dynamically as virtual machine instances are continuously brought up and down to accommodate load changes.

Discovery service 640 is used by platform router proxy service 616 to find the actual network addresses of other services. When a new instance of a service starts up, the new instance notifies discovery service 640 of its actual network address, for example its Internet Protocol (IP) address. When an instance shuts down, the instance notifies discovery service 640 that the service is no longer provided by the instance with that network address. Discovery service 640 uses elastic IP addresses 648 to publish data within a service outside of the instance within which the service is running. Elastic IP addresses 648 make data produced by an instance of a service accessible to, for example, the public Internet.

Each of the services shown in FIG. 6 has a respective auto scaling component 618, 622, 626, 630, 634, 638, 642. The auto scaling component dynamically controls the number of virtual machine instances that are used to support a particular service. In one embodiment, the services shown in FIG. 6 are organized using AMAZON EC2 Auto Scaling groups such that the number of virtual machine instances running for a particular service is scaled up and down to match the demand for the service as the demand changes over time. Auto scaling may change the number of virtual machines assigned to a service by changing the config settings for that service. For example, during the Sunday dinner hour, new virtual machine instances may be launched to handle the increased number of requests and the resulting increased computational load on the services 624, 628. If the computational load exceeds a threshold, the auto scaling component may dedicate an entire server to the affected service.

System segment 614 also includes its own data store 644. Data store 644 stores application data 646, which is data collected and generated by delivery provider scheduling service 624 and food delivery service 628. In an embodiment, application data 646 is transferred to data store 644 using data streaming 643. In an embodiment, data streaming 643 is implemented using an AMAZON KINESIS data firehose. Data store 644 is implemented as a searchable database or data warehouse, for example. Data stored in data store 644 is used to build predictive models and generate recommendations as described above.

Although not shown, a web service-based implementation of product ordering system 108 and food order data 106 is contained in a product ordering system segment, and a web service-based implementation of food provider system 114 and food preparation data 116 is contained in a food provider system segment. The product ordering system segment and the food provider system segment are each implemented in a manner analogous to system segment 614, in an embodiment.

Additional Examples

Illustrative examples of the technologies disclosed herein are provided below. An embodiment of the technologies may include any at least one, and any combination of, the examples described below.

An example 1 includes a computer-implemented method for creating a digital plan for moving a vehicle, within a real-time time interval, in response to receipt by an online system of a volume of short-route pickup-and-delivery requests that increases over an operational period, the method including: receiving, by a hybrid optimization model, a set of digital inputs; where the set of digital inputs includes (i) pairs of geo-location data associated with pickup-and-delivery requests and (ii) geo-location data associated with the vehicle and (iii) precedence data that indicate an order in which geo-locations in a pair of geo-location data are to be visited; using the hybrid optimization model to generate, in an execution time that does not exceed the real-time time interval, a pickup and delivery plan that conforms to the precedence data as digital output in response to the set of digital inputs; where the hybrid optimization model includes a constraint programming-based solver that operates in coordination with at least one other solver; creating, digitally storing, transmitting, and causing display of the digital output on a display of a device that is associated with the vehicle.

An example 2 includes the subject matter of example 1, where the set of digital inputs includes pickup constraint data that indicates a minimum time of arrival at a geo-location associated with a pickup-and-delivery request, and the pickup and delivery plan generated by the hybrid optimization model conforms to the pickup constraint data. An example 3 includes the subject matter of example 1 or example 2, where the set of digital inputs includes delivery constraint data that indicates a maximum time of arrival at a geo-location associated with a pickup-and-delivery request, and the pickup and delivery plan generated by the hybrid optimization model conforms to the delivery constraint data. An example 4 includes the subject matter of any of examples 1-3, where the set of digital inputs includes vehicle constraint data that indicates a maximum number of requests that can be carried concurrently by the vehicle, and the pickup and delivery plan generated by the hybrid optimization model conforms to the vehicle constraint data. An example 5 includes the subject matter of any of examples 1-4, where the set of digital inputs includes travel constraint data that limits the vehicle to one visit to every geo-location associated with the pickup-and-delivery requests, and the pickup and delivery plan generated by the hybrid optimization model conforms to the travel constraint data. An example 6 includes the subject matter of any of examples 1-5, where the set of digital inputs includes travel constraint data that limits vehicle travel to shortest distances between geo-locations associated with the pickup-and-delivery requests, and the pickup and delivery plan generated by the hybrid optimization model conforms to the travel constraint data. An example 7 includes the subject matter of any of examples 1-6, where the set of digital inputs includes travel constraint data that limits vehicle travel to visiting a maximum of ten geo-locations on a route, and the pickup and delivery plan generated by the hybrid optimization model conforms to the travel constraint data. An example 8 includes the subject matter of any of examples 1-7, where the real-time time interval is in a range of about 50 milliseconds to about 100 milliseconds and the volume of short-route pickup-and-delivery requests is in a range of about 6 to about 12 pickup-and-delivery requests. An example 9 includes the subject matter of any of examples 1-8, where the hybrid optimization model uses output of the constraint programming-based solver that is computed within the real-time time interval as input to a mixed integer programming-based solver. An example 10 includes the subject matter of any of examples 1-9, where the hybrid optimization model uses any one or more of the following to configure the constraint programming-based solver: an assignment problem relaxation solver, a reduced cost-base variable domain filtering process, a set-based precedence process, a regret branching process, a sequential closest neighbor branching process. An example 11 includes the subject matter of any of examples 1-10, further including operating the vehicle to move along a driving route according to the pickup and delivery plan as specified in the digital output.

An example 12 includes one or more non-transitory storage media storing instructions which, when executed by one or more computing devices, cause the one or more computing devices to: receive, by a hybrid optimization model, a set of digital inputs; where the set of digital inputs includes (i) pairs of geo-location data associated with pickup-and-delivery requests and (ii) geo-location data associated with the vehicle and (iii) precedence data that indicate an order in which geo-locations in a pair of geo-location data are to be visited; using the hybrid optimization model to generate, in an execution time that does not exceed the real-time time interval, a pickup and delivery plan that conforms to the precedence data as digital output in response to the set of digital inputs; where the hybrid optimization model includes a constraint programming-based solver that operates in coordination with at least one other solver; creating, digitally storing, transmitting, and causing display of the digital output on a display of a device that is associated with the vehicle.

An example 13 includes the subject matter of example 12, where the set of digital inputs includes pickup constraint data that indicates a minimum time of arrival at a geo-location associated with a pickup-and-delivery request, and the pickup and delivery plan generated by the hybrid optimization model conforms to the pickup constraint data. An example 14 includes the subject matter of example 12 or example 13, where the set of digital inputs includes delivery constraint data that indicates a maximum time of arrival at a geo-location associated with a pickup-and-delivery request, and the pickup and delivery plan generated by the hybrid optimization model conforms to the delivery constraint data. An example 15 includes the subject matter of any of examples 12-14, where the set of digital inputs includes vehicle constraint data that indicates a maximum number of requests that can be carried concurrently by the vehicle, and the pickup and delivery plan generated by the hybrid optimization model conforms to the vehicle constraint data. An example 16 includes the subject matter of any of examples 12-15, where the set of digital inputs includes travel constraint data that limits the vehicle to one visit to every geo-location associated with the pickup-and-delivery requests, and the pickup and delivery plan generated by the hybrid optimization model conforms to the travel constraint data. An example 17 includes the subject matter of any of examples 12-16, where the set of digital inputs includes travel constraint data that limits vehicle travel to shortest distances between geo-locations associated with the pickup-and-delivery requests, and the pickup and delivery plan generated by the hybrid optimization model conforms to the travel constraint data. An example 18 includes the subject matter of any of examples 12-17, where the set of digital inputs includes travel constraint data that limits vehicle travel to visiting a maximum of ten geo-locations on a route, and the pickup and delivery plan generated by the hybrid optimization model conforms to the travel constraint data. An example 19 includes the subject matter of any of examples 12-18, where the real-time time interval is in a range of about 50 milliseconds to about 100 milliseconds and the volume of short-route pickup-and-delivery requests is in a range of about 6 to about 12 pickup-and-delivery requests. An example 20 includes the subject matter of any of examples 12-19, where the hybrid optimization model uses output of the constraint programming-based solver that is computed within the real-time time interval as input to a mixed integer programming-based solver. An example 21 includes the subject matter of any of examples 12-20, where the hybrid optimization model uses any one or more of the following to configure the constraint programming-based solver: an assignment problem relaxation solver, a reduced cost-base variable domain filtering process, a set-based precedence process, a regret branching process, a sequential closest neighbor branching process. An example 22 includes the subject matter of any of examples 12-21, further including operating the vehicle to move along a driving route according to the pickup and delivery plan as specified in the digital output.

General Considerations

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used in this disclosure the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," etc., indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to effect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

What is claimed is:

1. A computer-implemented method for creating a plurality of digital plans for delivering a plurality of meal pickup-and-delivery requests using a plurality of vehicles, the method comprising:
   receiving, by an online system operated by an application computing device over a network, a plurality of meal pickup-and-delivery requests within an operational period, each meal pickup-and-delivery request comprising an order, an order submit time, geo-location data associated with a pickup location and geo-location data associated with a delivery location;

determining, for each meal pickup-and-delivery request, an item in the order and a preparation time for the item;

determining geo-location data associated with a current location of each vehicle in the plurality of vehicles;

determining, for at least one meal pickup-and-delivery request, a maximum time of arrival of each vehicle at the delivery location based on the geo-location data of each vehicle, and the geo-location data of the pickup-and-delivery location; and using a hybrid optimization model in an execution time that does not exceed a computational time constraint, the hybrid optimization model comprising a constraint programming-based solver that operates in coordination with at least one other solver, the constraint programming-based solver being configured with set-based circuit precedence, assignment problem relaxations providing reduced cost-based domain filtering, and a sequential closest neighbor branching or regret branching, generating a set of pickup and delivery plans for the plurality of meal pickup-and-delivery requests including the at least one meal pickup-and-delivery request having the maximum time of arrival of each vehicle at the delivery location, the generating comprising:

determining an order ready time associated with each meal pickup-and-delivery request based on one or more of the order submit time and the preparation time for the item;

determining a set of vehicles of the plurality of vehicles for completing each of the plurality of meal pickup and delivery requests, wherein each vehicle in the set of vehicles is determined based on one or more of the current location of each vehicle, the geo-location data of the pickup location, an estimated time of arrival of each vehicle at the pickup location in response to determining the order ready time or an estimated time of arrival at a delivery location;

determining delivery constraint data including a maximum time for order delivery completion by each vehicle for each meal pickup-and-delivery request;

communicating the computed pickup and delivery plan to each vehicle in the set of vehicles conforming to precedence data that indicate an order in which each geolocation associated with a pickup location and each geo-location data associated with a delivery location is to be visited based on one or more of the order submit time and the order ready time, wherein at least one pickup and delivery plan is based on the maximum time of arrival at the delivery location;

creating a digital output of the computed pickup and delivery plan for displaying on a device that is associated with the vehicle, digitally storing the digital output in a database of the application computing device, transmitting the digital output to the vehicle for displaying, and causing the display of the digital output on the display of the device that is associated with the vehicle.

2. The method of claim 1, wherein a meal pickup-and-delivery request of the plurality of meal pickup-and-delivery requests comprises pickup constraint data that indicates a minimum time of arrival at a geo-location associated with a meal pickup-and-delivery request, and the pickup and delivery plan generated by the hybrid optimization model conforms to the pickup constraint data.

3. The method of claim 1, wherein determining a maximum time of arrival at a geo-location associated with a meal pickup-and-delivery request is based on one of an agreed-upon time window or a requirement of a delivery recipient, wherein the pickup and delivery plan generated by the hybrid optimization model conforms to the delivery constraint data.

4. The method of claim 1, further comprising generating a pickup and delivery plan for a set of meal pickup-and-delivery requests using a vehicle by generating a pickup and delivery plan based on vehicle constraint data that indicates a maximum number of the set of meal pickup-and-delivery requests that can be carried concurrently by the vehicle, the pickup and delivery plan generated by the hybrid optimization model conforming to the vehicle constraint data.

5. The method of claim 1, further comprising generating a pickup and delivery plan for a set of meal pickup-and-delivery requests using a vehicle by generating a pickup and delivery plan based on travel constraint data that limits the vehicle to one visit to every geo-location associated with the set of meal pickup-and-delivery requests, the pickup and delivery plan generated by the hybrid optimization model conforming to the travel constraint data.

6. The method of claim 1, further comprising generating a pickup and delivery plan for a set of meal pickup-and-delivery requests using a vehicle by generating a pickup and delivery plan based on travel constraint data that limits vehicle travel distance between geo-locations associated with the set of meal pickup-and-delivery requests, the pickup and delivery plan generated by the hybrid optimization model conforming to the travel constraint data.

7. The method of claim 1, further comprising generating a pickup and delivery plan for a set of meal pickup-and-delivery requests using a vehicle by generating a pickup and delivery plan based on travel constraint data that limits vehicle travel to visiting a maximum often geo-locations on a route, wherein the pickup and delivery plan generated by the hybrid optimization model conforming to the travel constraint data.

8. The method of claim 1, wherein the computational time constraint comprises a real-time time interval in a range of about 50 milliseconds to about 100 milliseconds and the set of meal pickup-and-delivery requests is in a range of about 6 to about 12 pickup-and-delivery requests.

9. The method of claim 8, wherein the hybrid optimization model uses output of the constraint programming-based solver that is computed within the real-time time interval as input to a mixed integer programming-based solver.

10. The method of claim 1, further comprising operating the vehicle to move along a driving route according to the pickup and delivery plan as specified in the digital output.

11. One or more non-transitory storage media storing instructions which, when executed by one or more computing devices, cause the one or more computing devices to:

receive a plurality of meal pickup-and-delivery requests within an operational period, each meal pickup-and-delivery request comprising an order, an order submit time, geo-location data associated with a pickup location and geo-location data associated with a delivery location;

determine, for each meal pickup-and-delivery request, an item in the order and a preparation time for the item;

determine geo-location data associated with a current location of each vehicle in the plurality of vehicles;

determine, for at least one meal pickup-and-delivery request, a maximum time of arrival of each vehicle at the delivery location based on the geo-location data of each vehicle, and the geo-location data of the pickup-and-delivery location; and using a hybrid optimization model in an execution time that does not exceed a computational time constraint, the hybrid optimization model comprising a constraint programming-based solver that operates in coordination with at least one other solver, the constraint programming-based solver being configured with set-based circuit precedence, assignment problem relaxations providing reduced cost-based domain filtering, and a sequential closest neighbor branching or regret branching, generate a set of pickup and delivery plans for the plurality of meal pickup-and-delivery requests including the at least one meal pickup-and-delivery request having the maximum time of arrival of each vehicle at the delivery location in an execution time that does not exceed a computational time constraint, comprising:

determine an order ready time associated with each meal pickup-and-delivery request based on one or more of the order submit time and the preparation time for the item;

determine a set of vehicles of the plurality of vehicles for completing each of the plurality of meal pickup and delivery requests, wherein each vehicle in the set of vehicles is determined based on one or more of the current location of each vehicle, the geo-location data of the pickup location, an estimated time of arrival of each vehicle at the pickup location in response to determining the order ready time or an estimated time of arrival at a delivery location;

determine delivery constraint data including a maximum time for order delivery completion by each vehicle for each meal pickup-and-delivery request;

communicate the computed pickup and delivery plan to each vehicle in the set of vehicles conforming to precedence data that indicate an order in which each geolocation associated with a pickup location and each geo-location data associated with a delivery location is to be visited based on one or more of the order submit time and the order ready time, wherein at least one pickup and delivery plan is based on the maximum time of arrival at the delivery location;

create a digital output of the computed pickup and delivery plan for displaying on a device that is associated with the vehicle, digitally store the digital output in a database of the application computing device, transmit the digital output to the vehicle for displaying and cause display of the digital output on the display of the device that is associated with the vehicle.

12. The one or more non-transitory storage media of claim 11, further comprising sequences of instructions which when executed by the one or more computing devices cause generating a pickup and delivery plan for a set of meal pickup-and-delivery requests using a vehicle by generating a pickup and delivery plan based on pickup constraint data that indicates a minimum time of arrival at a geo-location associated with a meal pickup-and-delivery request, and the pickup and delivery plan generated by the hybrid optimization model conforming to the pickup constraint data.

13. The one or more non-transitory storage media of claim 11, further comprising sequences of instructions which when executed by the one or more computing devices cause generating a pickup and delivery plan for a set of meal pickup-and-delivery requests using a vehicle by generating a pickup and delivery plan based on delivery constraint data that indicates a maximum time of arrival at a geo-location associated with a meal pickup-and-delivery request based on one of an agreed-upon time window or a requirement of a delivery recipient, and the pickup and delivery plan generated by the hybrid optimization model conforming to the delivery constraint data.

14. The one or more non-transitory storage media of claim 11, further comprising sequences of instructions which when executed by the one or more computing devices cause generating a pickup and delivery plan for a set of meal pickup-and-delivery requests using a vehicle by generating a pickup and delivery plan based on vehicle constraint data that indicates a maximum number of the set of meal pickup-and-delivery requests that can be carried concurrently by the vehicle, and the pickup and delivery plan generated by the hybrid optimization model conforming to the vehicle constraint data.

15. The one or more non-transitory storage media of claim 11, further comprising sequences of instructions which when executed by the one or more computing devices cause generating a pickup and delivery plan for a set of meal pickup-and-delivery requests using a vehicle by generating a pickup and delivery plan based on travel constraint data that limits the vehicle to one visit to every geolocation associated with the set of meal pickup-and-delivery requests, and the pickup and delivery plan generated by the hybrid optimization model conforming to the travel constraint data.

16. The one or more non-transitory storage media of claim 11, further comprising sequences of instructions which when executed by the one or more computing devices cause generating a pickup and delivery plan for a set of meal pickup-and-delivery requests using a vehicle by generating a pickup and delivery plan based on travel constraint data that limits vehicle travel to between geo-locations associated with the set of meal pickup-and-delivery requests, and the pickup and delivery plan generated by the hybrid optimization model conforming to the travel constraint data.

17. The one or more non-transitory storage media of claim 11, further comprising sequences of instructions which when executed by the one or more computing devices cause generating a pickup and delivery plan for a set of meal pickup-and-delivery requests using a vehicle by generating a pickup and delivery plan based on travel constraint data that limits vehicle travel to visiting a maximum of ten geo-locations on a route, and the pickup and delivery plan generated by the hybrid optimization model conforming to the travel constraint data.

18. The one or more non-transitory storage media of claim 11, wherein the computational time constraint comprises a real-time time interval in a range of about milliseconds to about 100 milliseconds and the set of meal pickup-and-delivery requests is in a range of about 6 to about 12 pickup-and-delivery requests.

19. The one or more non-transitory storage media of claim 18, wherein the hybrid optimization model uses output of the constraint programming-based solver that is computed within the real-time time interval as input to a mixed integer programming-based solver.

20. The one or more non-transitory storage media of claim 11, further comprising operating the vehicle to move along a driving route according to the pickup and delivery plan as specified in the digital output.

* * * * *